US012773681B2

(12) United States Patent
Hatton et al.

(10) Patent No.: US 12,773,681 B2
(45) Date of Patent: Oct. 27, 2026

(54) PROCESSES FOR REGENERATING SORBENTS, AND ASSOCIATED SYSTEMS

(71) Applicant: Massachusetts Institute of Technology, Cambridge, MA (US)

(72) Inventors: Trevor Alan Hatton, Sudbury, MA (US); Takuya Harada, Nagoya (JP); Cameron G. Halliday, Wokingham (GB)

(73) Assignee: Massachusetts Institute of Technology, Cambridge, MA (US)

( * ) Notice: Subject to any disclaimer, the term of this patent is extended or adjusted under 35 U.S.C. 154(b) by 768 days.

(21) Appl. No.: 18/167,030

(22) Filed: Feb. 9, 2023

(65) Prior Publication Data

US 2024/0024853 A1 Jan. 25, 2024

Related U.S. Application Data

(63) Continuation of application No. 17/090,146, filed on Nov. 5, 2020, now Pat. No. 11,577,223.

(60) Provisional application No. 62/988,436, filed on Mar. 12, 2020, provisional application No. 62/979,628, filed on Feb. 21, 2020, provisional application No. 62/932,410, filed on Nov. 7, 2019.

(51) Int. Cl.
*B01J 20/34* (2006.01)

(52) U.S. Cl.
CPC ....... *B01J 20/3475* (2013.01); *B01J 20/3433* (2013.01); *B01J 20/3483* (2013.01); *B01J 20/3491* (2013.01); *B01D 2251/302* (2013.01); *B01D 2251/304* (2013.01); *B01D 2251/306* (2013.01); *B01D 2257/504* (2013.01)

(58) Field of Classification Search
CPC ................ B01J 20/3475; B01J 20/3433; B01J 20/3483; B01J 20/3491; B01D 2251/302; B01D 2251/304; B01D 2251/306; B01D 2257/504
USPC ............................................................ 502/55
See application file for complete search history.

(56) References Cited

U.S. PATENT DOCUMENTS

| | | | |
|---|---|---|---|
| 1,783,901 | A | 12/1930 | Bottoms |
| 3,438,728 | A | 4/1969 | Grantham |
| 3,754,074 | A | 8/1973 | Grantham |
| 3,932,582 | A | 1/1976 | Eickmeyer |
| 4,086,323 | A | 4/1978 | Moore et al. |
| 4,208,387 | A | 6/1980 | Klass et al. |
| 4,448,899 | A | 5/1984 | Hass |
| 4,470,958 | A | 9/1984 | van Gelder et al. |
| 4,973,456 | A | 11/1990 | Quinn et al. |
| 5,338,521 | A | 8/1994 | Quinn et al. |

(Continued)

FOREIGN PATENT DOCUMENTS

| | | | |
|---|---|---|---|
| CN | 102448581 | A | 5/2012 |
| CN | 102895847 | A | 1/2013 |

(Continued)

OTHER PUBLICATIONS

U.S. Appl. No. 18/167,023, filed Feb. 9, 2023, Hatton et al.

(Continued)

*Primary Examiner* — Anita Nassiri-Motlagh
(74) *Attorney, Agent, or Firm* — Wolf, Greenfield & Sacks, P.C.

(57) ABSTRACT

Processes for regenerating sorbents at high temperatures, and associated systems, are generally described.

19 Claims, 14 Drawing Sheets

(56) References Cited

U.S. PATENT DOCUMENTS

| | | | | |
|---|---|---|---|---|
| 5,455,015 | A | 10/1995 | Zhadanovsky | |
| 5,466,270 | A | 11/1995 | Abdelmalek | |
| 7,022,168 | B2 | 4/2006 | Schimkat et al. | |
| 7,674,947 | B2 | 3/2010 | Barends | |
| 8,715,394 | B2 | 5/2014 | Caram et al. | |
| 10,322,399 | B2 | 6/2019 | Harada et al. | |
| 10,434,458 | B2 | 10/2019 | Denton et al. | |
| 10,464,015 | B2 | 11/2019 | Worsley et al. | |
| 10,625,204 | B2 | 4/2020 | Lubomirksy et al. | |
| 10,913,658 | B2 | 2/2021 | Harada et al. | |
| 11,291,950 | B2 | 4/2022 | Hatton et al. | |
| 11,311,840 | B2 | 4/2022 | Hatton et al. | |
| 11,577,223 | B2 | 2/2023 | Hatton et al. | |
| 11,602,716 | B2 | 3/2023 | Hatton et al. | |
| 12,409,407 | B2 | 9/2025 | Park et al. | |
| 12,558,651 | B2 | 2/2026 | Hatton et al. | |
| 2010/0139484 | A1* | 6/2010 | Li | B01D 53/62 95/42 |
| 2011/0035154 | A1 | 2/2011 | Kendall et al. | |
| 2011/0089377 | A1 | 4/2011 | Bingham et al. | |
| 2012/0128559 | A1 | 5/2012 | Olsen | |
| 2014/0079612 | A1 | 3/2014 | Krutka et al. | |
| 2014/0112856 | A1 | 4/2014 | Krutka et al. | |
| 2014/0154158 | A1 | 6/2014 | Lubomirsky et al. | |
| 2016/0059179 | A1 | 3/2016 | Billings | |
| 2017/0128856 | A1 | 5/2017 | Anguille et al. | |
| 2017/0165633 | A1 | 6/2017 | Harada et al. | |
| 2017/0361266 | A1 | 12/2017 | Find et al. | |
| 2018/0243688 | A1 | 8/2018 | Hamrin | |
| 2018/0354807 | A1 | 12/2018 | Harada et al. | |
| 2019/0262767 | A1* | 8/2019 | Boulet | C10L 3/104 |
| 2021/0138401 | A1 | 5/2021 | Hatton et al. | |
| 2021/0138438 | A1 | 5/2021 | Hatton et al. | |
| 2021/0387141 | A1 | 12/2021 | Hatton et al. | |
| 2022/0258098 | A1 | 8/2022 | Hatton et al. | |
| 2022/0266193 | A1 | 8/2022 | Park et al. | |
| 2024/0033684 | A1 | 2/2024 | Hatton et al. | |

FOREIGN PATENT DOCUMENTS

| | | | |
|---|---|---|---|
| CN | 107029538 | A | 8/2017 |
| DE | 100 35 188 | A1 | 2/2002 |
| EP | 0 414 292 | A1 | 2/1991 |
| JP | S60-097028 | A | 5/1985 |
| JP | H03-114513 | A | 5/1991 |
| JP | H04-367723 | A | 12/1992 |
| JP | H11-183050 | A | 7/1999 |
| JP | 2002-093452 | A | 3/2002 |
| JP | 2003-300041 | A | 10/2003 |
| JP | 2005-230808 | A | 9/2005 |
| JP | 2006-205023 | A | 8/2006 |
| JP | 2012-528002 | A | 11/2012 |
| JP | 2012-250142 | A | 12/2012 |
| JP | 2022-526115 | | 9/2024 |
| WO | WO 2010/137995 | A1 | 12/2010 |
| WO | WO 2012/176208 | A1 | 12/2012 |
| WO | WO 2018/227081 | A1 | 12/2018 |
| WO | WO 2020/072115 | A1 | 4/2020 |

OTHER PUBLICATIONS

PCT/US2020/059167, Feb. 25, 2021, Invitation to Pay Additional Fees.

PCT/US2020/059167, Apr. 16, 2021, International Search Report and Written Opinion.

Notice of Allowance for JP Application No. 2022-526115 dated May 7, 2025.

Restriction Requirement for U.S. Appl. No. 18/167,023 dated Jul. 11, 2025.

Notice of Allowance for U.S. Appl. No. 18/167,023 dated Oct. 15, 2025.

Kibar et al., A Novel Process for CO2 Capture by Using Sodium Metaborate, Part II: Carbonation Reaction and Kinetic Studies. Int J Chem Kinet. Feb. 2017;49(2):119-29. doi: 10.1002/kin.21061.

Japanese Notice of Reasons for Rejection for Application No. 2022-526115, mailed Sep. 2, 2024.

Kibar et al., A novel process for CO2 capture by using sodium metaborate. Part I: effects of calcination. Environ Sci Pollut Res Int. Feb. 2018;25(4):3446-3457. doi: 10.1007/s11356-017-0644-4. Epub Nov. 19, 2017.

Office Action for CA Application No. 3,160,467 dated Nov. 27, 2025.

Supplemental Notice of Allowability for U.S. Appl. No. 18/167,023 dated Jan. 16, 2026.

Office Action for U.S. Appl. No. 17/090,180 mailed Aug. 11, 2021.

Notice of Allowance for U.S. Appl. No. 17/090,180 mailed Nov. 29, 2021.

Notice of Allowance for U.S. Appl. No. 17/681,413, mailed Nov. 7, 2022.

International Search Report and Written Opinion for International Patent Application No. PCT/US2020/059167, mailed Apr. 16, 2021.

Invitation to Pay Additional Fees for International Patent Application No. PCT/US2020/059167, mailed Feb. 25, 2021.

[No Author Listed], Alternative Control Techniques Document—NOx Emissions from Iron and Steel Mills. United States Environmental Protection Agency. Sep. 1994:170 pages.

[No Author Listed], Effective date of implementation of the fuel oil standard in regulation 14.1.3 of MARPOL Annex VI, Resolution MEPC.280(70). International Maritime Organization. London, United Kingdom. Adopted Oct. 28, 2016. 1 page.

[No Author Listed], Initial IMO Strategy on Reduction of GHG Emissions from Ships, Resolution MEPC.304(72). International Maritime Organization. London, United Kingdom. Adopted Apr. 13, 2018. 11 pages.

[No Author Listed], Sulphur 2020 implementation—IMO issues additional guidance. International Maritime Organization. London, United Kingdom. May 20, 2019:5 pages. Accessed from <http://www.imo.org/en/MediaCentre/PressBriefings/Pages/10-MEPC-74-sulphur-2020.aspx>.

[No Author Listed], Title IV—Acid Deposition Control. United States Environmental Protection Agency. 2002:68 pages.

Abanades et al., Conversion Limits in the Reaction of CO2 with Lime. Energy and Fuels. 2003; 17:308-15. Epub Jan. 28, 2003.

Alcalde et al., Estimating geological CO2 storage security to deliver on climate mitigation. Nature Communications. 2018;9:2201. 13 pages.

Alderman et al., Borate Melt Structure: Temperature-Dependent B—O Bond Lengths and Coordination Numbers from High-Energy X-Ray Diffraction. J. Am. Ceram. Soc. 2018; 101:3357-71.

Alderman et al., Temperature-Driven Structural Transitions in Molten Sodium Borates Na20-B203: X-Ray Diffraction, Thermodynamic Modeling, and Implications for Topological Constraint Theory. J. Phys. Chem. C. 2016;120:553-60. Epub Dec. 16, 2015.

Allanore et al., A New Anode Material for Oxygen Evolution in Molten Oxide Electrolysis. Nature. May 16, 2013;497:353-6.

Araten, Some Molten Ionic Oxides as Chemical Reagents. J. Appl. Chem. Apr. 1968;18:118-21.

Argyle et al., Heterogeneous Catalyst Deactivation and Regeneration: A Review. Catalysts. 2015;5:145-269. Epub Feb. 26, 2015.

Avrami, Kinetics of Phase Change. I General Theory. J. Chem. Phys. Journal of Chemical Physics. Dec. 1939;7:1103-12.

Backensto et al., High Temperature Hydrogen Sulfide Corrosion. Corrosion. Jan. 1956; 12:22-32.

Barker et al., The Reversibility of the Reaction CaCO3 ⇆ CaO+ CO2. J. Appl. Chem. Biotechnol. 1973;23:733-42.

Basu, Combustion of coal in circulating fluidized-bed boilers: a review. Chemical Engineering Science. 1999;54:5547-57.

Bell et al., An overview of technologies for reduction of oxides of nitrogen from combustion furnaces. MPR Associates. Washington, DC. Accessed Nov. 9, 2021 as available Mar. 22, 2015 from <https://web.archive.org/web/20150322202854/https://www.mpr.com/uploads/news/nox-reduction-coal-fired.pdf>. 23 pages.

(56) References Cited

OTHER PUBLICATIONS

Belo et al., High-Temperature Conversion of SO2 to SO3: Homogeneous Experiments and Catalytic Effect of Fly Ash from Air and Oxy-fuel Firing. Energy & Fuels. 2014;28:7243-51. Epub Oct. 23, 2014.
Berstad et al., Post-Combustion CO2 Capture from a Natural Gas Combined Cycle by CaO/CaCO3 Looping. Int. J. Greenh. Gas Control. 2012; 11:25-33. Epub Aug. 24, 2012.
Bhatia et al., Effect of the Product Layer on the Kinetics of the CO2-Lime Reaction. AIChE J. Jan. 1983;29(1):79-86.
Blamey et al., The calcium looping cycle for large-scale CO2 capture. Progress in Energy and Combustion Science. 2010;36:260-79. Epub Dec. 29, 2009.
Blomen et al., Capture Technologies: Improvements and Promising Developments. Energy Procedia. 2009;1:1505-12.
Bobkova et al., Low-Melting Glasses Based on Borate Systems. Glas. Ceram. (English Transl. Steklo i Keramika.) 2004;61(5-6):175-7.
Bosoaga et al., CO2 capture technologies for cement industry. Energy Procedia. 2009;1:133-40.
Bui et al., Carbon capture and storage (CCS): the way forward. Energy & Environmental Science. 2018;11:1062-176. Epub Mar. 12, 2018.
Chakravarty et al., Reaction of acid gases with mixtures of amines. Chem. Eng. Prog. Apr. 1985;81(4):32-6.
Chen et al., High-temperature sulfidation behavior of Ni—Nb alloys. Oxidation of Metals. 1989;31(3/4):237-63.
Chen et al., Outdoor air pollution: nitrogen dioxide, sulfur dioxide, and carbon monoxide health effects. The American Journal of the Medical Sciences. Apr. 2007;333(4):249-56.
Choi et al., Adsorbent materials for carbon dioxide capture from large anthropogenic point sources. ChemSusChem. 2009;2(9):796-854. doi: 10.1002/cssc.200900036.
Courson et al., CaO-Based High-Temperature CO2 Sorbents. In Pre-combustion Carbon Dioxide Capture Materials; Wang, Q., Ed.; The Royal Society of Chemistry. London, United Kingdom. 2018:144-237.
Cousin-Saint-Remi et al., Applying the wave theory to fixed-bed dynamics of Metal-Organic Frameworks exhibiting stepped adsorption isotherms: Water/ethanol separation on ZIF-8. Chemical Engineering Journal. 2017;324:313-23. Epub Apr. 28, 2017.
Cuffe et al., Air Pollutant Emissions from Coal-Fired Power. Journal of the Air Pollution Control Association. 1964; 14(9):353-62.
Da Silva et al., Emissions from Postcombustion CO2 Capture Plants. Environmental Science & Technology. 2013;47:659-60. Epub Jan. 3, 2013.
D'Alessandro et al., Carbon Dioxide Capture: Prospects for New Materials. Angewandte Chemie International Edition. Aug. 2010;49:6058-82.
Darunte et al., Moving Beyond Adsorption Capacity in Design of Adsorbents for CO2 Capture from Ultradilute Feeds: Kinetics of CO2 Adsorption in Materials with Stepped Isotherms. Industrial & Engineering Chemistry Research. 2019;58:366-77. Epub Dec. 6, 2018.
Das et al., An Overview of Utilization of Slag and Sludge from Steel Industries. Resour. Conserv. Recycl. 2007;50:40-57. Epub Jul. 7, 2006.
Davidson et al., IPCC Special Report on Carbon Dioxide Capture and Storage. Prepared by Working Group III of the International Panel on Climate Change. [Metz, B., O. Davidson, H. C. de Coninck, M. Loos, and L. A. Meyer (eds.)]. Cambridge University Press, Cambridge, United Kingdom and New York, Ny, USA. 2005:443 pages.
De Bruijn et al., Kinetic Parameters in Avrami—Erofeev Type Reactions from Isothermal and Non-Isothermal Experiments. Thermochimica Acta. 1981;45:315-25.
Dessureault et al., Coupled Phase Diagram/Thermodynamic Analysis of the Nine Common-Ion Binary Systems Involving the Carbonates and Sulfates of Lithium, Sodium, and Potassium. Journal of the Electrochemical Society. Sep. 1990;137:2941-50.
Dolan et al., Multicomponent Diffusion in Molten Slags. Metall. Mater. Trans. B. Aug. 2004;35B:675-84.
Dutcher et al., Amine-Based CO2 Capture Technology Development from the Beginning of 2013-A Review. ACS Appl. Mater. Interfaces. 2015;7:2137-48. Epub Jan. 21, 2015.
Edenhofer et al., Climate Change 2014: Mitigation of Climate Change. Contribution of Working Group III to the Fifth Assessment Report of the Intergovernmental Panel on Climate Change. Cambridge University Press, Cambridge, United Kingdom and New York, NY, USA. 2014:1454 pages.
Elkin et al., Molten Oxide Glass Materials for Thermal Energy Storage. Energy Procedia. 2014;49:772-9.
EOW, Recovery of Sulfur from Sour Acid Gas: A Review of the Technology. Environmental Progress. Oct. 2002;21(3):143-62.
Fang et al., Continuous CO2 Capture from Flue Gases Using a Dual Fluidized Bed Reactor with Calcium-Based Sorbent. Ind. Eng. Chem. Res. 2009;48:11140-7. Epub Nov. 18, 2009.
Feng et al., Overcoming the Problem of Loss-in-Capacity of Calcium Oxide in CO2 Capture. Energy and Fuels. 2006;20:2417-20. Epub Oct. 5, 2006.
Fine et al., Absorption of nitrogen oxides in aqueous amines. Energy Procedia. 2014;63:830-47.
Gao et al., MgO-Based Intermediate-Temperature CO2 Adsorbents. In Pre-combustion Carbon Dioxide Capture Materials; Wang, Q., Ed.; The Royal Society of Chemistry. London, United Kingdom. 2018:61-143.
Garg et al., A technology review for regeneration of sulfur rich amine systems. International Journal of Greenhouse Gas Control. 2018;75:243-53.
Gehring et al., Emissions Trading Lessons From SOx and NOx Emissions Allowance and Credit Systems Legal Nature, Title, Transfer, and Taxation of Emission Allowances and Credits. Environmental Law Reporter. 2005:17 pages.
Grasa et al., CO2 Capture Capacity of CaO in Long Series of Carbonation/Calcination Cycles. Ind. Eng. Chem. Res. 2006;45:8846-51. Epub Nov. 9, 2006.
Guidotti, Hydrogen Sulfide: Advances in Understanding Human Toxicity. International Journal of Toxicology. 2010;29(6):569-81. Epub Nov. 12, 2010.
Gupta et al., Carbonation-Calcination Cycle Using High Reactivity Calcium Oxide for Carbon Dioxide Separation from Flue Gas. Industrial & Engineering Chemistry Research. 2002;41:4035-42. Epub Jul. 11, 2002.
Halliday et al., Acid Gas Capture at High Temperatures Using Molten Alkali Metal Borates. Environ Sci Technol. May 19, 2020;54(10):6319-6328. doi: 10.1021/acs.est.0c01671. Epub Apr. 29, 2020.
Halliday et al., Bench-Scale Demonstration of Molten Alkali Metal Borates for High-Temperature CO2 Capture. Ind. Eng. Chem. Res. 2020;59(19):8937-45. Epub Apr. 19, 2020.
Halliday et al., Sorbents for the Capture of CO2 and Other Acid Gases: A Review. Ind. Eng. Chem. Res. 2021;60(26):9313-46. Epub Jun. 28, 2021.
Hanak et al., A review of developments in pilot-plant testing and modelling of calcium looping process for CO2 capture from power generation systems. Energy & Environmental Science. 2015;8:2199-249. Epub Jun. 8, 2015.
Hanak et al., Calcium looping combustion for high-efficiency low-emission power generation. Journal of Cleaner Production. 2017;161:245-55. Epub May 19, 2017.
Harada et al., Alkali Metal Nitrate-Promoted High-Capacity MgO Adsorbents for Regenerable CO2 Capture at Moderate Temperatures. Chem Mater. 2015;27:1943-9. Epub Mar. 3, 2015.
Harada et al., Colloidal Nanoclusters of MgO Coated with Alkali Metal Nitrates/Nitrites for Rapid, High Capacity CO2 Capture at Moderate Temperature. Chem Mater. 2015;27:8153-61. Epub Nov. 9, 2015.
Harada et al., Molten ionic oxides for CO2 capture at medium to high temperatures. J. Mater. Chem. A. 2019;7:21827-34. Epub Sep. 5, 2019.
Harada et al., Tri-lithium borate (Li3BO3); a new highly regenerable high capacity CO2 adsorbent at intermediate temperature. J. Mater. Chem A. 2017;5:22224-33. Epub Oct. 7, 2017.

(56) References Cited

OTHER PUBLICATIONS

Harrison, Sorption-Enhanced Hydrogen Production: A Review. Ind. Eng. Chem. Res. 2008;47:6486-501. Epub Jul. 31, 2008.
Jansen et al., Pre-Combustion CO2 Capture. Int. J. Greenh. Gas Control. 2015;40:167-87. Epub Jul. 27, 2015.
Janz et al., Molten Salts Data: Diffusion Coefficients in Single and Multi Component Salt Systems. J. Phys. Chem. Ref. Data. 1982;11(3):505-693.
Kato et al., Carbon Dioxide Absorption by Lithium Orthosilicate in a Wide Range of Temperature and Carbon Dioxide Concentrations. J. Mater. Sci. Lett. 2002;21:485-7.
Khawam et al., Solid-State Kinetic Models: Basics and Mathematical Fundamentals. J. Phys. Chem. B. 2006;110:17315-28. Epub Aug. 15, 2006.
Kierzkowska et al., CaO-Based CO2 Sorbents: From Fundamentals to the Development of New, Highly Effective Materials. ChemSusChem. 2013;6:1130-48.
Kim et al., A Solid Sorbent-Based Multi-Stage Fluidized Bed Process with Inter-Stage Heat Integration as an Energy Efficient Carbon Capture Process. Int. J. Greenh. Gas Control. 2014;26:135-46. Epub May 21, 2014.
Ko et al., The sorption of hydrogen sulfide from hot syngas by metal oxides over supports. Chemosphere. 2005;58:467-74. Epub Nov. 10, 2004.
Koningen et al., Sulfur-Deactivated Steam Reforming of Gasified Biomass. Ind. Eng. Chem. Res. 1998;37:341-6. Epub Jan. 16, 1998.
Koytsoumpa et al., The CO2 economy: Review of CO2 capture and reuse technologies. The Journal of Supercritical Fluids. 2018; 132:3-16. Epub Jul. 25, 2017.
Kramer et al., Thermal Decomposition of NaNO3 and KNO3. Proceedings of The Electrochemical Society. 1981:494-505.
Lara et al., Energy integration of high and low temperature solid sorbents for CO2 capture. Energy Procedia. 2017;114:2380-9.
Lashof et al., Relative contributions of greenhouse gas emissions to global warming. Nature. Apr. 5, 1990;344:529-31.
Lee et al., Potential flue gas impurities in carbon dioxide streams separated from coal-fired power plants. J. Air & Waste Mange. Assoc. Jun. 2009;59:725-32.
Leung et al., An overview of current status of carbon dioxide capture and storage technologies. Renewable and Sustainable Energy Reviews. 2014;39:426-43. Epub Aug. 2, 2014.
Likens et al., Acid Rain: A Serious Regional Environmental Problem. Science. Jun. 14, 1974;184(4142):1176-9.
Lin et al., The mechanism of coal gas desulfurization by iron oxide sorbents. Chemosphere. 2015;121:62-7. Epub Nov. 27, 2014.
Lu et al., Calcium Oxide Based Sorbents for Capture of Carbon Dioxide at High Temperatures. Ind. Eng. Chem. Res. 2006;45:3944-9. Epub May 3, 2006.
Mazzotti et al., Equilibrium theory-based analysis of nonlinear waves in separation processes. Annual Review of Chemical and Biomolecular Engineering. 2013;4:119-41. Epub Feb. 28, 2013.
Memon et al., Alkali Metal CO2 Sorbents and the Resulting Metal Carbonates: Potential for Process Intensification of Sorption-Enhanced Steam Reforming. Environ. Sci. Technol. 2017;51;12-27. Epub Dec. 7, 2016.
Mess et al., Product Layer Diffusion during the Reaction of Calcium Oxide with Carbon Dioxide. Energy and Fuels. 1999;13:999-1005. Epub Jul. 22, 1999.
Misiak et al., Next Generation Post-combustion Capture: Combined CO2 and SO2 Removal. Energy Procedia. Dec. 2013;37:1150-9.
Mitsui et al., High Temperature Sulfidation and Oxidation Behavior of Sputter-Deposited AI-refractory Metal Alloys. Materials Transactions, JIM. 1996;37(3):379-82.
Miyamoto et al., KM CDR ProcessTM Project Update and the New Novel Solvent Development. Energy Procedia. 2017;114:5616-23.
Mrowec, The Problem of Sulfur in High-Temperature Corrosion. Oxidation of Metals. 1995;44(1/2): 177-209.
Nakagawa et al., A Novel Method of CO2 Capture from High Temperature Gases. J. Electrochem. Soc. Apr. 1998;145(4):1344-6.
Nielsen et al., Atmospheric chemistry and environmental impact of the use of amines in carbon capture and storage (CCS). Chemical Society Reviews. 2012;41:6684-704.
Oko et al., Current Status and Future Development of Solvent-Based Carbon Capture. Int. J. Coal Sci. Technol. 2017;4(1):5-14. Epub Feb. 27, 2017.
Pachauri et al., Climate Change 2014: Synthesis Report. Contribution of Working Groups I, II and III to the Fifth Assessment Report of the Intergovernmental Panel on Climate Change [Core Writing Team, R.K. Pachauri and L.A. Meyer (eds.)]. IPCC, Geneva, Switzerland. 2015:169 pages.
Pearson et al., An Update on the Development of the CSIRO's CS-Cap Combined CO2 and SO2 Capture Process. Energy Procedia. 2017; 114:1721-8.
Perejon et al., The Calcium-Looping technology for CO2 capture: On the important roles of energy integration and sorbent behavior. Applied Energy. 2016;162:787-807. Epub Nov. 11, 2015.
Plessen et al., Verwertung von Natriumsulfat. Chem. Ing. Tech. 1989;61:933-40.
Qiao et al., Alkali Nitrates Molten Salt Modified Commercial MgO for Intermediate-Temperature CO2 Capture: Optimization of the Li/Na/K Ratio. Ind. Eng. Chem. Res. 2017;56:1509-17. Epub Jan. 23, 2017.
Ramkumar et al., Calcium Looping Process for Enhanced Catalytic Hydrogen Production with Integrated Carbon Dioxide and Sulfur Capture. Industrial & Engineering Chemistry Research. Ind. Eng. Chem. Res. 2011;50:1716-29. Epub Dec. 27, 2010.
Rao et al., A Technical, Economic, and Environmental Assessment of Amine-Based CO2 Capture Technology for Power Plant Greenhouse Gas Control. Environmental Science & Technology. 2002;36:4467-75. Epub Sep. 6, 2002.
Reddy et al., Layered Double Hydroxides for CO2 Capture: Structure Evolution and Regeneration. Ind. Eng. Chem. Res. 2006;45:7504-9. Epub Oct. 4, 2006.
Rees et al., Electrochemical CO2 sequestration in ionic liquids: a perspective. Energy & Environmental Science. 2010;4:403-8. Epub Dec. 20, 2010.
Rezaei et al., SOx/NOx Removal from Flue Gas Streams by Solid Adsorbents: A Review of Current Challenges and Future Directions. Energy Fuels. 2015;29(9):5467-86. Epub Aug. 4, 2015.
Robinson, Sulfur Removal and Recovery. Springer Handbook of Petroleum Technology. Springer International Publishing. 2017:649-73.
Rochelle et al., Aqueous piperazine as the new standard for CO2 capture technology. Chemical Engineering Journal. 2011;171:725-33. Epub Feb. 24, 2011.
Rochelle, Amine Scrubbing for CO2 Capture. Science. Sep. 25, 2009;325:1652-4.
Rochelle, Thermal degradation of amines for CO2 capture. Current Opinion in Chemical Engineering. 2012;1:183-90.
Rockstrom et al., A roadmap for rapid decarbonization. Science. Mar. 24, 2017;355(6331):1269-71.
Rodriguez et al., Interaction of Sulfur with Well-Defined Metal and Oxide Surfaces: Unraveling the Mysteries behind Catalyst Poisoning and Desulfurization. Accounts of Chemical Research. 1999;32(9):719-28. Epub Jun. 16, 1999.
Rogelj et al., Energy system transformations for limiting end-of-century warming to below 1.5 °C. Nature Climate Change. Jun. 2015;5:519-27.
Rubin et al., The outlook for improved carbon capture technology. Progress in Energy and Combustion Science. 2012;38:630-71. Epub May 12, 2012.
Sada et al., Solubility of carbon dioxide in molten alkali halides and nitrates and their binary mixtures. J. Chem. Eng. Data. 1981; 26(3):279-81.
Schmalensee et al., Lessons Learned from Three Decades of Experience with Cap and Trade. Review of Environmental Economics and Policy. 2017;11(1):59-79.
Schorr et al., Gas Turbine NOx Emissions Approaching Zero—Is it Worth the Price? GE Power Generation. General Electric Company. Schenectady, NY. 1999:11 pages.
Sexton et al., Evaluation of Reclaimer Sludge Disposal from Post-combustion CO2 Capture. Energy Procedia. 2014;63:926-39.

(56) References Cited

OTHER PUBLICATIONS

Shartsis et al., Viscosity and Electrical Resistivity of Molten Alkali Borates. J. Am. Ceram. Soc. Oct. 1, 1953;36(10):319-26.
Shimizu et al., A Twin Fluid-Bed Reactor for Removal of CO2 from Combustion Processes. Trans IChemE. Jan. 1999;77(A):62-8.
Singh et al., A review on methods of flue gas cleaning from combustion of biomass. Renewable and Sustainable Energy Reviews. 2014;29:854-64. Epub Oct. 2, 2013.
Singh et al., Shell Cansolv CO2 capture technology: Achievement from First Commercial Plant. Energy Procedia. 2014;63:1678-85. Epub Dec. 31, 2014.
Song, CO2 conversion and utilization: an overview. ACS Symposium Series, American Chemical Society. Washington, DC. 2002:29 pages.
Sötz et al., Molten salt chemistry in nitrate salt storage systems: Linking experiments and modeling. Energy Procedia. 2018;155:503-13.
Spengler et al., Acid air and health. Environmental Science & Technology. 1990;24(7):946- 56.
Srivastava et al., Flue Gas Desulfurization: The State of the Art. Journal of the Air & Waste Management Association. Dec. 2001;51:1676-88.
Stanger et al., Oxyfuel Combustion for CO2 Capture in Power Plants. Int. J. Greenh. Gas Control. 2015;40:55-125. Epub Aug. 4, 2015.
Strohle et al., Simulation of the Carbonate Looping Process for Post-Combustion CO2 Capture from a Coal-Fired Power Plant. Chem. Eng. Technol. 2009;32(3):435-42.
Subha et al., Enhanced CO2 Absorption Kinetics in Lithium Silicate Platelets Synthesized by a Sol-gel Approach. J. Mater. Chem. A. 2014;2:12792. Author manuscript provided. 9 pages.
Sun et al., Abatement technologies for high concentrations of NOx and SO2 removal from exhaust gases: A review. Critical Reviews in Environmental Science and Technology. 2016;46(2):119-42. Epub Sep. 23, 2015.
Sun et al., Ceramics Bonding Using Solder Glass Frit. J. Electron. Mater. 2004;33(12):1516-23.
Tian et al., Inherent potential of steelmaking to contribute to decarbonisation targets via industrial carbon capture and storage. Nature Communications. 2018;9:4422. 8 pages.
Veawab et al., Corrosion Behavior of Carbon Steel in the CO2 Absorption Process Using Aqueous Amine Solutions. Ind. Eng. Chem. Res. 1999;38:3917-24. Epub Sep. 8, 1999.
Venegas et al., Kinetic and Reaction Mechanism of CO2 Sorption on Li4SiO4: Study of the Particle Size Effect. Ind. Eng. Chem. Res. 2007;46:2407-12. Epub Mar. 9, 2007.
Veneman et al., Continuous CO2 Capture in a Circulating Fluidized Bed Using Supported Amine Sorbents. Chem. Eng. J. 2012;207-208:18-26. Epub Jun. 30, 2012.
Wachi et al., Mass Transfer with Chemical Reaction and Precipitation. Chem. Eng. Sci. 1991;46:1027-33.
Wang et al., Amine reclaiming technologies in post-combustion carbon dioxide capture. Journal of Environmental Sciences. 2015;27:276-89. Epub Nov. 12, 2014.
Wang et al., Recent advances in solid sorbents for CO 2 capture and new development trends. Energy & Environmental Science. 2014;7:3478-518. Author manuscript provided. 46 pages.
Wang et al., Subpilot Demonstration of the Carbonation-Calcination Reaction (CCR) Process: High-Temperature CO2 and Sulfur Capture from Coal-Fired Power Plants. Industrial & Engineering Chemistry Research. 2010;49:5094-101. Epub Feb. 17, 2010.
Wang et al., Synthesis of High-Temperature CO2 Adsorbents from Organo-Layered Double Hydroxides with Markedly Improved CO2 Capture Capacity. Energy Environ. Sci. 2012;5:7526-30.
Wang et al., Thermodynamic Optimization of the Na20-B203 Pseudo-Binary System. J. Phase Equilibria. 2003;24(1):12-20.
Watkins et al., Diffusion of Multi-Isotopic Chemical Species in Molten Silicates. Geochim. Cosmochim. Acta. 2014;139:313-26. Epub May 9, 2014.
Weiland et al., Effect of Heat-Stable Salts on Amine Absorber and Regenerator Performance. Conference Proceedings Presented at Fall Meeting of AIChE, Austin, Texas. Nov. 7, 2004:13 pages.
Wieckol-Ryk et al., Analysis of Biomass Blend Co-Firing for Post Combustion CO2 Capture. Sustainability. 2018;10:923. 15 pages. Epub Mar. 22, 2018.
Xiang et al., Experimental and Modeling Studies on Sulfur Trioxide of Flue Gas in a Coal- Fired Boiler. Energy & Fuels. 2017;31:6284-97. Epub May 16, 2017.
Xiao et al., A Citrate Sol-gel Method to Synthesize Li2ZrO3 Nanocrystals with Improved CO2 Capture Properties. J. Mater. Chem. 2011;21:3838-42.
Xu et al., Mathematically modeling fixed-bed adsorption in aqueous systems. Journal of Zhejiang University—Science A. 2013; 14(3):155-76.
Yi et al., Continuous Operation of the Potassium-Based Dry Sorbent CO2 Capture Process with Two Fluidized-Bed Reactors. Int. J. Greenh. Gas Control. 2007;1:31-6. Epub Feb. 21, 2007.
Yin et al., Calcium Looping for CO2 Capture at a Constant High Temperature. Energy & Fuels. 2014;28:307-18. Epub Sep. 13, 2013.
Yin et al., High-Temperature Pressure Swing Adsorption Process for CO2 Separation. Energy & Fuels. 2012;26:169-75. Epub Oct. 26, 2011.
Yu et al., Nitrosamines and Nitramines in Amine-Based Carbon Dioxide Capture Systems: Fundamentals, Engineering Implications, and Knowledge Gaps. Environmental Science & Technology. 2017;51:11522-36. Epub Sep. 25, 2017.
Yun, Unusual adsorber dynamics due to S-shaped equilibrium isotherm. Korean Journal of Chemical Engineering. 2000;17(5):613-7.
Zhang et al., Phase Transfer-Catalyzed Fast CO2 Absorption by MgO-Based Absorbents with High Cycling Capacity. Adv. Mater. Interfaces. 2014;1:1400030. 6 pages.
Zhu et al., System and Processes of Pre-Combustion Carbon Dioxide Capture and Separation. In Pre-combustion Carbon Dioxide Capture Materials; Wang, Q., Ed.; Royal Society of Chemistry. London, United Kingdom. 2018:281-334.

* cited by examiner

NGCC with High Temperature Post Combustion Capture – Molten Oxides

SMR with SER driven by Steam – Molten Oxides

PROCESSES FOR REGENERATING SORBENTS, AND ASSOCIATED SYSTEMS

RELATED APPLICATIONS

This application is a continuation of U.S. patent application Ser. No. 17/090,146, filed Nov. 5, 2020, and entitled "Processes for Regenerating Sorbents, and Associated Systems," which claims priority under 35 U.S.C. § 119(e) to U.S. Provisional Patent Application No. 62/988,436, filed Mar. 12, 2020, and entitled "Processes for Regenerating Sorbents, and Associated Systems," to U.S. Provisional Patent Application No. 62/979,628, filed Feb. 21, 2020, and entitled "Processes for Regenerating Sorbents, and Associated Systems," and to U.S. Provisional Patent Application No. 62/932,410, filed Nov. 7, 2019, and entitled "Process for Regenerating Sorbents at High Temperatures," each of which is incorporated herein by reference in its entirety for all purposes.

TECHNICAL FIELD

Processes for regenerating sorbents, and associated systems, are generally described.

BACKGROUND

Mitigation of global warming requires the development of new technologies designed for a world in which climate change is a harsh reality. It is widely agreed that a multi-faceted approach is required to distribute risk amongst competing technologies. However, the existing energy, chemicals, and heavy industry sectors hold a powerful advantage in low cost readily available feedstocks and prevailing infrastructure. Carbon capture, utilization, and storage (CCUS) makes up an important part of the multi-faceted effort because of its compatibility with the status-quo. In the energy industry, such a system would see the continued use of fossil fuels with carbon removed either prior to combustion or after combustion. The removed $CO_2$ may find use in industry or be cheaply and securely returned to the subterranean environment for permeant storage. In other industries such as cement and steel, CCUS may be the only practical option in a carbon constrained future. CCUS could therefore move rapidly and capitalize on the benefit afforded to incumbents while addressing the underlying issue of $CO_2$ emissions.

Current methods of carbon capture have not been widely deployed in part due to technical and economic limitations. Accordingly, improved methods for carbon capture, utilization, and storage are needed.

SUMMARY

Processes for regenerating sorbents, and associated systems, are generally described. Certain embodiments are related to the use of steam to remove one or more captured acid gases from the sorbent. The subject matter of the present invention involves, in some cases, interrelated products, alternative solutions to a particular problem, and/or a plurality of different uses of one or more systems and/or articles.

Certain aspects are related to methods. In some embodiments, the method comprises regenerating a sorbent that has been exposed to an acid gas via exposure to steam such that at least part of the acid gas is separated from the sorbent.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Disclosed herein are processes for regenerating sorbents and associated systems. Certain embodiments are related to the use of steam to remove one or more captured acid gases from the sorbent. The sorbent can comprise, in some embodiments, a molten material, such as a molten alkali borate material.

The use of steam as a sorbent regenerant, especially at high temperatures, can provide a variety of advantages. For example, in some cases, after the steam has been used to remove one or more acid gases from the sorbent, the steam (along with removed acid gases) can be cooled such that the steam condenses while the acid gas remains in gaseous form. This can allow for relatively easy separation of the steam and the acid gas. Moreover, steam is commonly produced in many industrial processes that generate acid gases, making the source of the regenerant (e.g., steam) readily available.

The use of steam as a regenerant can be particularly useful, in some cases, in systems in which the acid gas sorbent is at high temperatures. For example, in certain embodiments, steam is used to regenerate molten sorbents, such as molten alkali metal borate material. Steam can generally remain chemically stable at such high temperatures, and, as noted above, the steam condensation cycle can allow for relatively facile separation of the acid gas released during regeneration and the steam used during regeneration.

Figure 1A:
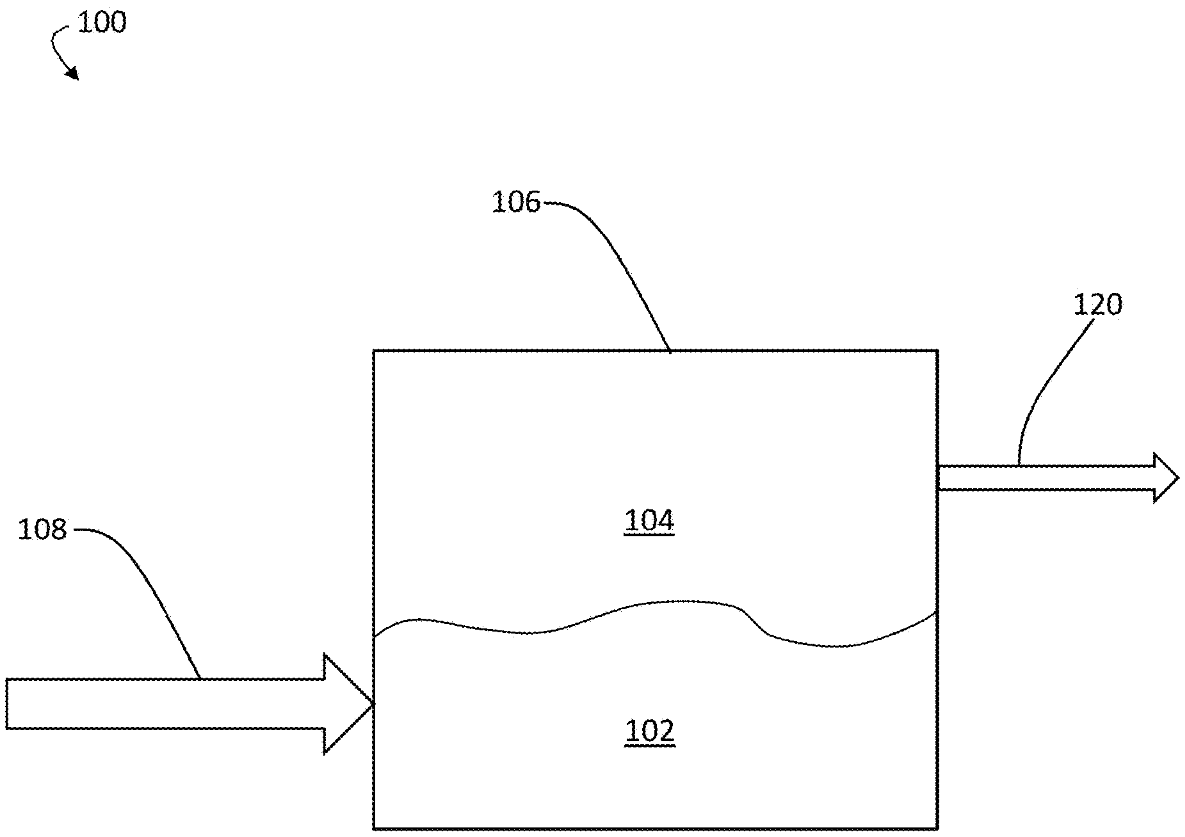
FIGS. 1A-1B are schematic diagrams showing examples of processes of sorbent regeneration, according to some embodiments.

Certain embodiments are related to regenerating a sorbent. In some embodiments, regenerating the sorbent comprises exposing the sorbent to an environment containing steam. FIG. 1A is a schematic diagram illustrating one such process. In FIG. 1A, sorbent 102 is exposed to steam within head space 104.

"Steam," as used herein, refers to water ($H_2O$) in its gaseous form (also referred to as its vapor form). Both subcritical steam and supercritical steam are considered to fall within the scope of the term "steam" as these terms are used herein. In some embodiments, exposure of the sorbent to the steam results in at least part of an acid gas associated with the sorbent to be separated from the sorbent. For example, referring back to FIG. 1A, in some embodiments, steam within vessel 106 (e.g., within head space 104 and/or flowed through sorbent 102) can interact (e.g., physically interact) with sorbent 102 such that at least a part of an acid gas associated with sorbent 102 is removed from sorbent 102. In some embodiments, exposure of the sorbent, by which an acid gas has been captured, to steam may reduce the partial pressure of the acid gas in an environment around the sorbent. This reduction of partial pressure of the acid gas by the steam may facilitate the release of acid gas from the sorbent (e.g., via a change in the capture equilibrium, such as a change in an adsorption equilibrium, an absorption equilibrium, a chemical reaction equilibrium, and/or a diffusion equilibrium). While FIG. 1A shows steam interacting with the sorbent, it should be understood that in some embodiments, the steam does not interact with sorbent. That is to say, in some embodiments, the sorbent does not interact (e.g., physically interact, chemically interact) with the sorbent. In some embodiments, the steam is chemically inert with the sorbent.

In some embodiments, the steam may occupy a volume (e.g., a head space) proximate a sorbent during sorbent regeneration. In some embodiments, for at least a portion of the time during which the regeneration is performed, the head space contains steam in an amount of at least 75 wt %, at least 85 wt %, at least 95 wt %, at least 99 wt %, at least 99.9 wt %, or more. In some embodiments, the amount of steam within the headspace does not fall below 50 wt %, 25 wt %, 10 wt %, or 1% during the regeneration step. The remaining portion of the head space that is not occupied by the steam can be, in some embodiments, acid gas.

In some embodiments, the molar ratio of steam to acid gas in the sorbent (i.e., the ratio between the moles of steam in the gas phase and the moles of acid gas held in the sorbent phase) during sorbent regeneration may have a particular value. In some embodiments, for at least a portion of the time during which the regeneration is performed, the molar ratio of steam in the gas phase to acid gas in the sorbent is at least 1, at least 10, at least 100, at least 1000, at least 10,000, or more. In some embodiments, the molar ratio of steam to acid gas in the sorbent does not fall below 0.5, below 0.1, below 0.01, or below 0.001 during the regeneration step. This molar ratio may exist within any portion of the release environment, for example, within a sorbent contained within the release environment. In some embodiments, the molar ratio of steam to sorbent is 0.1, 1, 10, 100, 1000, or in a range between these values.

In some embodiments, an inlet stream to a vessel containing the sorbent that is being regenerated can contain steam in an amount of at least 75 mol %, at least 85 mol %, at least 95 mol %, at least 99 mol %, at least 99.9 mol %, or more.

In some embodiments, an outlet stream from a vessel containing the sorbent that is being regenerated can contain steam in an amount of at least 50 mol %, at least 75 mol %, at least 90 mol %, or more. In certain embodiments, at least 75 mol %, at least 90 mol %, at least 95 mol %, at least 99 mol %, or at least 99.9 mol % of an outlet stream from a vessel containing the sorbent that is being regenerated is made up of steam and/or acid gas.

In some embodiments, the steam and the sorbent can be separated from each other, and at least part of the acid gas that was removed from the sorbent accompanies the steam, thus separating the acid gas from the sorbent. For example, referring to FIG. 1A, in some embodiments, the steam may be removed from vessel 106 via outlet 120. At least part of the acid gas that was removed from sorbent 102 can accompany the steam that is removed via outlet 120, thus separating this portion of the acid gas from sorbent 102.

The steam and/or sorbent can be introduced to each other in any of a variety of suitable ways. In some embodiments, the steam can be flowed into a vessel containing the sorbent. As one example, the steam can be used as (or as part of) a sweep stream that is flowed across the sorbent. For example, in FIG. 1A, steam can be transported into vessel 106 via inlet stream 108. In some embodiments, the sorbent may be flowable and may be transported through a vessel containing the steam. Other methods are also possible.

Figure 2:
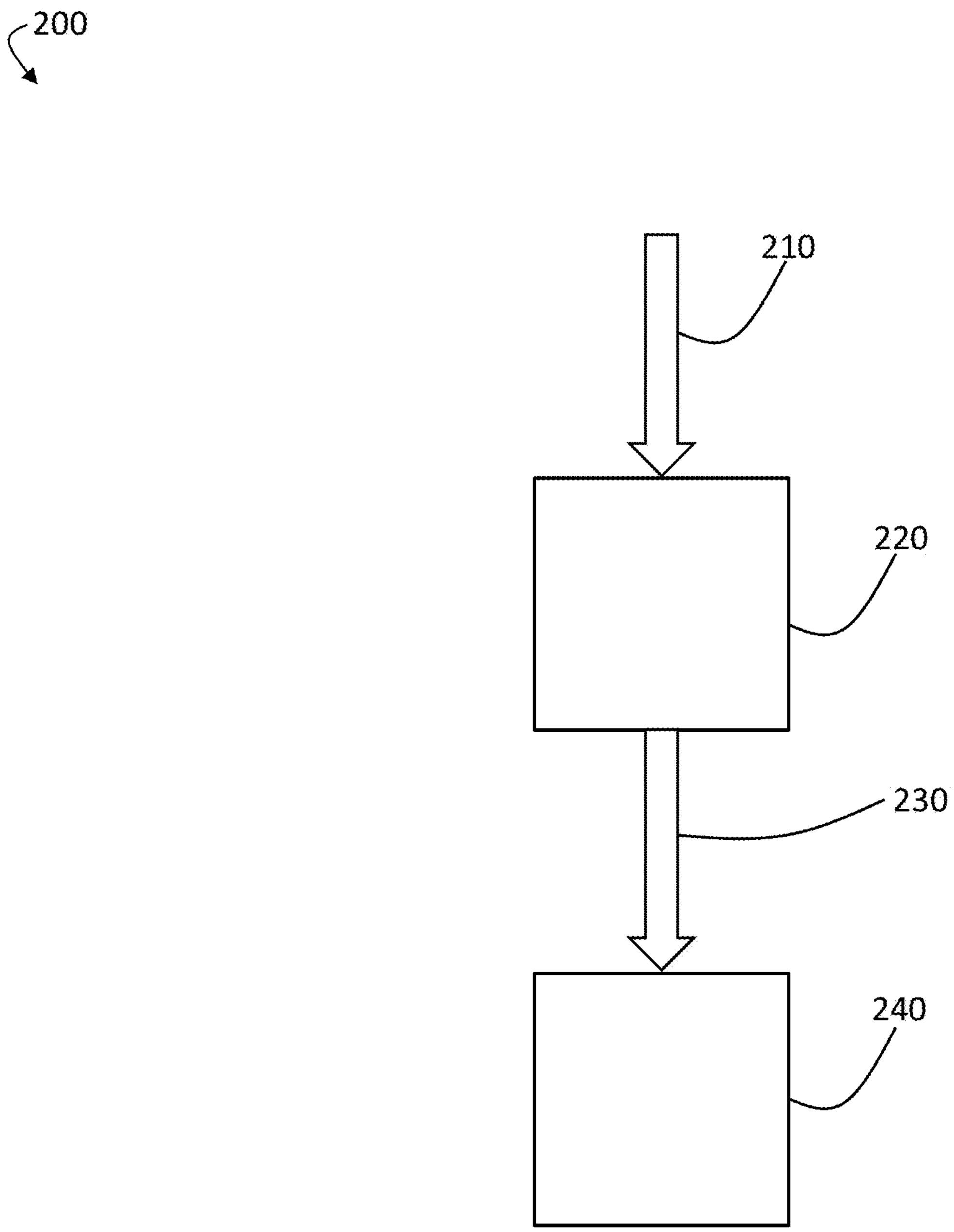
FIG. 2 is a schematic illustration of a process for regenerating a sorbent coupled with a condenser for condensing steam from a mixture of steam and acid gas, according to certain embodiments.

In some embodiments, the acid gas that is released from the sorbent can have originated from exposure of the sorbent to the acid gas. One exemplary process is described in more detail below in association with FIG. 2.

Examples of acid gases that can be captured by the sorbent and subsequently released are described in more detail below.

As used herein, the term "regenerating" refers to the removal of acid gas from the sorbent such that the capacity of the sorbent to capture acid gas is increased. In some embodiments, removal of an acid gas from the sorbent allows additional acid gas to be captured by the sorbent so that the sorbent may be recycled. That is to say, regenerating may comprise removal of an initial amount of acid gas such that the capacity of the sorbent to capture a subsequent amount of acid gas is increased. In some embodiments, regeneration may take place in a regenerator (e.g., a vessel, such as a desorber). In some embodiments, sorbent regeneration may occur at least one time, at least 10 times, at least $10^3$ times, at least $10^4$ times, at least $10^6$ times or more.

It should be understood that regeneration includes both partial regeneration of the sorbent's ability to capture acid gas as well as complete regeneration of the sorbent's ability to capture acid gas. In some embodiments, at least 1 wt % (or at least 5 wt %, at least 10 wt %, at least 25 wt %, at least 50 wt %, at least 75 wt %, at least 90 wt %, at least 95 wt %, at least 99 wt %, at least 99.9 wt %, or more) of the sorbent is regenerated during the regeneration step. In certain embodiments, at least 1 wt % (or at least 5 wt %, at least 10 wt %, at least 25 wt %, at least 50 wt %, at least 75 wt %, at least 90 wt %, at least 95 wt %, at least 99 wt %, at least 99.9 wt %, or more) of the sorbent that has captured acid gas may be regenerated during the regeneration step.

Sorbent regeneration may also be described in terms of an amount of captured acid gas released from the sorbent during regeneration. In some embodiments, a mole percentage of acid gas released from the sorbent during regeneration is at least 1 mol % (or at least 5 mol %, at least 10 mol %, at least 25 mol %, at least 50 mol %, at least 75 mol %, at least 90 mol %, at least 95 mol %, at least 99 mol %, at least 99.9 mol %, or more). In certain embodiments, at least 1 mol % (or at least 5 mol %, at least 10 mol %, at least 25 mol %, at least 50 mol %, at least 75 mol %, at least 90 mol %, at least 95 mol %, at least 99 mol %, at least 99.9 mol %, or more) of the acid gas captured by the sorbent may be regenerated during the regeneration step.

Any of a variety of suitable sorbents can be used in various of the embodiments disclosed herein. As used herein, the phrase "sorbent" is used to describe a material that is capable of removing acid gas (e.g., any of the acid gases described elsewhere herein) from an environment containing the acid gas. In some embodiments, the sorbent may function as a sequestration material. That is to say, the sorbent may be capable of sequestering acid gas. In some embodiments, the sorbent may function as an absorption material. That is to say, the sorbent may be capable of absorbing acid gas. In some embodiments, the sorbent may function as an adsorption material. That is to say, the sorbent may be capable of adsorbing acid gas. In some embodiments, the sorbent may chemically react with the acid gas. In some embodiments, the acid gas may diffuse into the sorbent. Combinations of these mechanisms are also possible. For example, in some embodiments, the sorbent may capture the acid gas(es) via chemisorption. Other capture mechanisms may exist.

Regeneration of the sorbent can involve a process that is the reverse of the process used to capture the acid gas. For example, if the sorbent captures the acid gas(es) via a chemical reaction, regeneration of the sorbent can involve, in certain cases, allowing the reverse of the chemical reaction used to capture the acid gas(es) to proceed. As another example, if the sorbent captures the acid gas(es) via adsorption, regeneration of the sorbent can involve breaking the adsorptive bonds between the sorbent and the captured acid gas(es).

In some embodiments, the sorbent may comprise an alkali metal borate, which can be used as sorbents to remove acid gas from streams (e.g., an input stream, an output stream). Specific examples of materials that can be used as sorbents are provided in more detail below.

The sorbent may be, in some embodiments, flowable. For example, in some embodiments, the sorbent may be in molten form. Those of ordinary skill in the art would understand that a molten material (e.g., a molten salt) is different from a solubilized material (e.g., a salt that has been dissolved within a solvent).

As one example, in some embodiments, the sorbent comprises a molten alkali metal borate. Molten alkali metal borates, in some embodiments, hold promise to improve the approach taken to carbon capture by allowing for liquid-based process designs at the high temperatures involved in most $CO_2$ emissions. At high temperatures the high-quality thermal energy content of all streams involved in a capture system may be recovered effectively. Fluid sorbents (e.g., molten alkali metal borates) further allow for simple, efficient liquid-liquid heat exchangers and generally provide an added benefit in their easy transfer between vessels dedicated to capture and release via transfer pumps. In certain cases, the molten alkali metal borate's high working capacity, ultra-fast kinetics, and intrinsic regenerability can impart them with exceptional potential.

The use of certain sorbents (e.g., sorbents comprising a salt in molten form, or other flowable sorbents) may provide the ability to use the sorbent at an elevated temperature, that is, at a temperature greater than or equal to the melting temperature of the sorbent (e.g., greater than or equal to 200° C.). The use of sorbents capable of operating at high temperatures can be particularly useful when steam is used to remove acid gas (e.g., by using the steam as a sweep gas), as it can allow for relatively easy subsequent separation of the acid gas and the steam (e.g., via condensation of the steam). The temperature may be higher than the melting temperature of the sorbent as well. In some embodiments, the temperature of a sorbent (e.g., a salt in molten form) may be at least 250° C., at least 300° C., at least 350° C., at least 400° C., at least 450° C., or at least 500° C., or higher. In some embodiments in which the sorbent is used at an elevated temperature, any of a variety of suitable amounts of the sorbent (e.g., greater than or equal to 1 wt %, greater than or equal to 10 wt %, greater than or equal to 50 wt %, greater than or equal to 75 wt %, greater than or equal to 90 wt %, greater than or equal to 99 wt %, or all of the sorbent) will be at that elevated temperature (e.g., greater than or equal to 200° C., greater than or equal to 250° C., greater than or equal to 300° C., greater than or equal to 350° C., greater than or equal to 400° C., greater than or equal to 450° C., greater than or equal to 500° C., and/or within any of the other temperature ranges mentioned above or elsewhere herein). In certain embodiments, the process can optionally take place in a pressure swing operation. The temperature of operation may refer to the temperature of the sorbent itself, which can be essentially equal to or different from the temperature of the environment to which the sorbent is exposed. In some embodiments, the environment in which the sorbent was exposed to the acid gas is at the same, or similar, temperature as the environment in which the sorbent was regenerated.

As noted above, regeneration of the sorbent can involve removing acid gas (e.g., a single acid gas, more than one acid gas) from the sorbent. Non-limiting examples of acid gases include carbon dioxide ($CO_2$), sulfur monoxide (SO), sulfur dioxide ($SO_2$), nitrogen dioxide ($NO_2$), hydrogen sulfide ($H_2S$), sulfur trioxide ($SO_3$), nitric oxide (NO), nitrous oxide ($N_2O$), dinitrogen trioxide ($N_2O_3$), dinitrogen tetroxide ($N_2O_4$), dinitrogen pentoxide ($N_2O_5$), and/or carbonyl sulfide (COS). In some embodiments, the acid gas comprises at least a nitrogen oxide and $CO_2$. In some embodiments, the acid gas comprises at least $CO_2$. Regeneration of the sorbent from other acid gases is also possible.

In some embodiments, regeneration of a sorbent comprises removing a single acid gas that is present in (e.g., captured within) the sorbent. In other embodiments, the sorbent may capture multiple acid gases (e.g., $CO_2$ and $SO_2$, $SO_2$ and $NO_2$; $CO_2$; $SO_2$; and $CO_2$, etc.).

Wherever an "acid gas" is described herein, it should be understood that, unless explicitly stated to the contrary, a single acid gas may be present or multiple acid gases may be present.

In some embodiments, the environment within which the steam is exposed to the sorbent can be at a relatively high temperature (e.g., superheated). The use of relatively high temperatures can ensure that the steam does not condense during exposure of the sorbent to the steam during sorbent regeneration. This can ensure that the steam and the acid gas may be transported away from the sorbent relatively easily, while also preserving the ability to separate the steam from the acid gas at a downstream location. In some embodiments, the environment within which the steam is exposed to the sorbent can be at a temperature of at least 200° C., at least 250° C., at least 300° C., at least 350° C., at least 400° C., at least 450° C., at least 500° C. Other temperatures are possible. In some embodiments, the temperature of the steam during the exposure of the sorbent to the steam can be at least 200° C., at least 250° C., at least 300° C., at least 350° C., at least 400° C., at least 450° C., or at least 500° C. Other temperatures are also possible.

The pressure of the regeneration environment may be within any of a variety of suitable pressures. In some embodiments, the pressure of the regeneration environment may be at least 0.01 bar, at least 0.1 bar, at least 1 bar, or at least 10 bar. In some embodiments, it can be advantageous to employ no or relatively low vacuum within the regeneration environment (e.g., pressures of at least 0.9 bar or higher). Employing no or relatively low vacuum may reduce complexity and reduce energy consumption associated with generating and/or maintaining the vacuum. In some embodiments, it can be advantageous to operate at high pressures (e.g., pressures above 1.1 bar, 5 bar, 10 bar, or 20 bar). Operating at high pressures may improve heat recovery and may also increase the electrical output of a steam turbine. In some embodiments, the pressure in the regeneration environment is 1 bar, 3 bar, 5 bar, 10 bar, 20 bar, 30 bar, 50 bar, or in a range between these pressures.

In some embodiments, the partial pressure of gas (e.g., steam, an acid gas) within the regeneration environment may be a variety of suitable pressures. In some embodiments, the partial pressure of a gas within the regeneration environment is at least 0.000001 bar, at least 0.0001 bar, at least 0.01 bar, or at least 1 bar. Providing a particular partial pressure of a gas can provide an adequate driving force for the release of an acid gas from a sorbent.

The amounts of steam and acid gas containing sorbent within the regeneration environment may establish any of a variety of suitable molar ratios. In certain embodiments, the molar ratio of steam to acid gas in the sorbent is at least 1, at least 10, at least 1000, or at least 10,000. The use of relatively high ratios of steam to acid gas in the sorbent can allow one to remove a relatively large amount of acid gas from the sorbent relatively efficiently. For example, consider a situation in which one contacts a stream containing 15 moles of $CO_2$ and 85 moles of $N_2$ with a sorbent, and the 15 moles of $CO_2$ are captured by the sorbent. Generally, when regenerating the sorbent, the partial pressure of acid gas within the regeneration stream would need to be reduced to at least below the partial pressure of acid gas that was present in the original $CO_2/N_2$ stream to which the sorbent was exposed. In this case, a supply of at least 85 moles of steam would be needed, and the ratio of steam to acid gas in the sorbent would need to be at least 85/15=5.7. Supplying even more steam would help to even further drive sorbent regeneration.

Figure 1B:
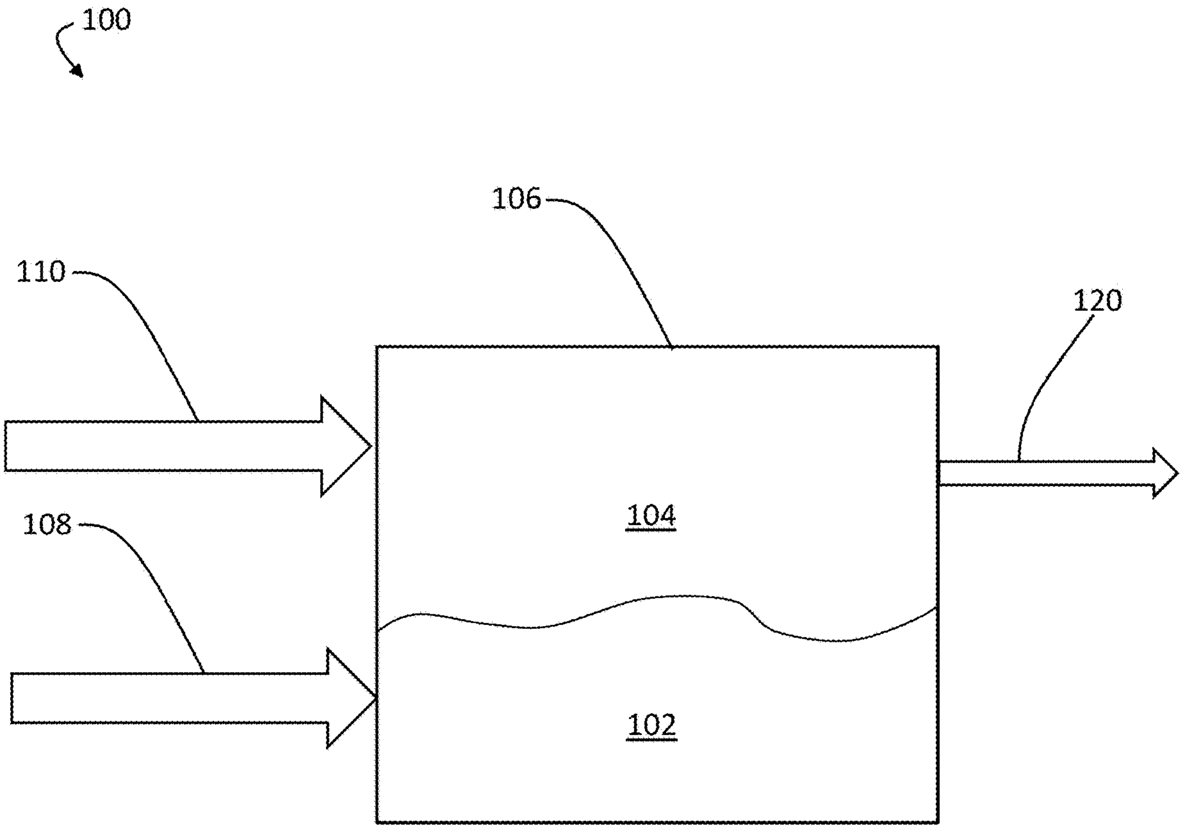

Some embodiments may further comprise exposing the sorbent to an acid gas such that the acid gas is captured by the sorbent. In some embodiments, this may occur before the sorbent has been at least partially regenerated. Referring now to FIG. 1B, system 100 may comprise inlet stream 110, in addition to second inlet stream 108. Inlet stream 110 may allow for the addition of an acid gas to sorbent 102, such that the acid gas is captured by sorbent 102. As one example, an exhaust stream from an industrial process may be transported through inlet 110, after which the exhaust stream is exposed to sorbent 102. In some such embodiments, sorbent 102 may capture one or more acid gases from the exhaust stream of the industrial process, producing a relatively clean stream (e.g., a stream reduced in an amount of one or more acid gases relative to the amount of one or more acid gases present in exhaust stream from the industrial process) that can exit vessel 106 via outlet 120.

In some such embodiments, it may be desirable to regenerate sorbent 102. The regeneration can be accomplished, for example, by transporting steam into vessel 106 (e.g., via inlet 108) such that spent sorbent 102 is exposed to the steam. In some such embodiments, exposure of sorbent 102 to the steam results in acid gas being removed from sorbent 102, thus regenerating sorbent 102. Optionally, sorbent 102 can then be reused in a subsequent acid gas capture step (e.g., by contacting sorbent 102 with an exhaust stream containing one or more acid gases for a second time).

In certain embodiments in which the sorbent is exposed to and captures acid gas, the temperature of the environment in which the sorbent was exposed to the acid gas may be the same, or similar to, the temperature of the environment in which the sorbent is regenerated. In certain embodiments, the temperature of the environment in which the sorbent is exposed to and captures the acid gas is within 200° C. (or within 100° C., within 50° C. within 10° C., or within 1° C.) of the temperature of the environment in which the sorbent is regenerated.

In some embodiments, the temperature of the environment in which the sorbent is exposed to and captures the acid gas is greater than or equal to 200° C., greater than or equal to 250° C., greater than or equal to 300° C., greater than or equal to 350° C., greater than or equal to 400° C., greater than or equal to 450° C., greater than or equal to 500° C., greater than or equal to 600° C., greater than or equal to 700° C., greater than or equal to 800° C., or higher, and/or less than or equal to 1000° C. In some embodiments, the environment is at a temperature of 800° C., 700° C., 600° C., 500° C., or above 200° C., or in a range between these temperatures. Combinations of the above-referenced ranges are also possible (e.g., greater than or equal to 200° C. and at most 700° C.). Other ranges are possible.

In some embodiments, the steam that is used to regenerate the sorbent may be subject to downstream processing after the sorbent regeneration. For example, in some embodiments, after the steam is used to regenerate the sorbent, the method further comprises cooling the mixture of steam and acid gas such that the condensed steam is separated from the acid gas. As noted above, the ability to condense steam while maintaining the acid gas in gaseous form can allow for relatively easy separation of the steam from the acid gas, providing a relatively pure stream of acid gas and a relatively pure stream of water. In some embodiments, the condensed steam may be recycled and converted back to steam to be reused in sorbent regeneration.

In some embodiments, the acid gas may be recovered in a relatively pure form (e.g., in a relatively pure acid gas stream) once the steam has been condensed from the acid gas and stream mixture. In some embodiments, the acid gas is recovered at a purity of greater than 50 wt %, greater than 60 wt %, greater than 70 wt %, greater than 80 wt %, greater than 90 wt %, greater than 95 wt %, greater than 99 wt %, or greater than 99.99 wt %. In some embodiments, the acid gas is recovered at a purity of 100 wt %. In some embodiments, the acid gas is recovered and subsequently compressed to ensure a purity of greater than 50 wt %, greater than 60 wt %, greater than 70 wt %, greater than 80 wt %, greater than 90 wt %, greater than 95 wt %, greater than 99 wt %, or greater than 99.99 wt %.

In some embodiments, a mixture of acid gas and steam is cooled in a heat exchanger to generate useful energy. The cooling of the mixture in a heat exchanger may increase the efficiency of energy use in an overall system for regenerating a sorbent. In certain embodiments, the mixture of acid gas and steam is cooled in a heat exchanger prior to separation in the condenser to generate useful energy. As one example, a turbine can be used to generate electrical energy as the steam is cooled.

In some embodiments, the condensed steam is heated and recycled back into the regeneration environment. In this way, the condensed steam may be recycled for further use. In some embodiments, sorbent regeneration may occur in multiple cycles. In some such embodiments, steam used during one sorbent regeneration step may be condensed from a mixture of steam and acid gas, re-heated in a subsequent step, and used again during the next sorbent regeneration step. In certain embodiments, the steam can be reused at least once, at least twice, at least 10 times, at least 100 times, at least 1000 times, or more.

Steam quality may be maintained in a variety of ways. In general, "steam quality" refers to the proportion of saturated steam (vapor) in a stream relative to the amount of condensate (liquid) in the stream. A steam quality of 100 indicates that the stream is 100% steam, and a steam quality of 0 indicates that the steam is 100% liquid. As used herein, steam quality is said to be "maintained" when at least some energy is input into the steam stream and/or the steam stream condensate. The energy that is input into a steam stream can be used, for example, to maintain or increase the temperature of the steam. The energy that is input into the steam stream condensate can be used, for example, to convert condensed steam (water) back into steam.

The quality of steam can be maintained via any of a number of sources relative to the sorbent regeneration process (e.g., an energy source internal to the process, or an energy source external to the process).

Figure 3A:
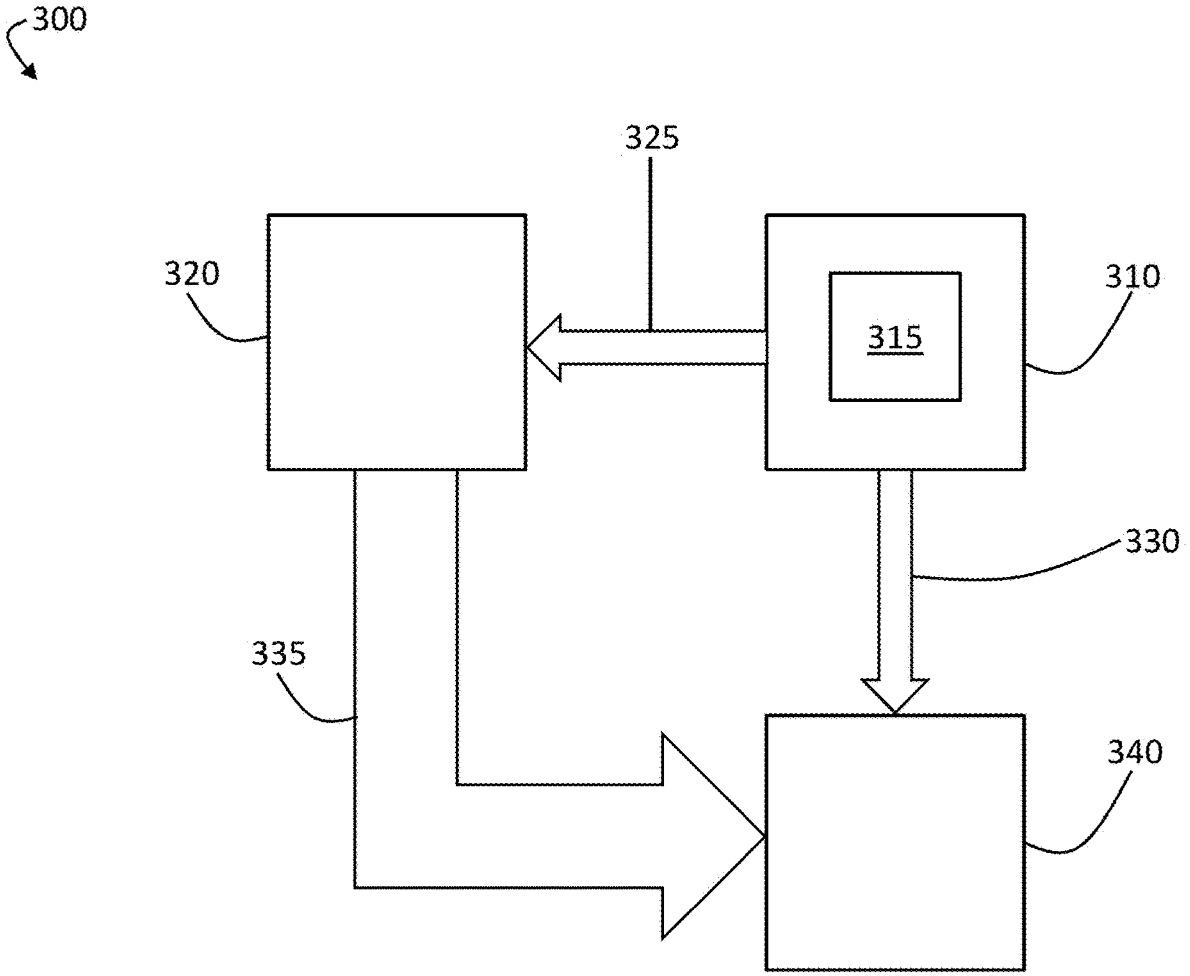
FIG. 3A is a schematic diagram showing steam maintained by an energy source internal to the acid gas source, according to certain embodiments.
Figure 8:
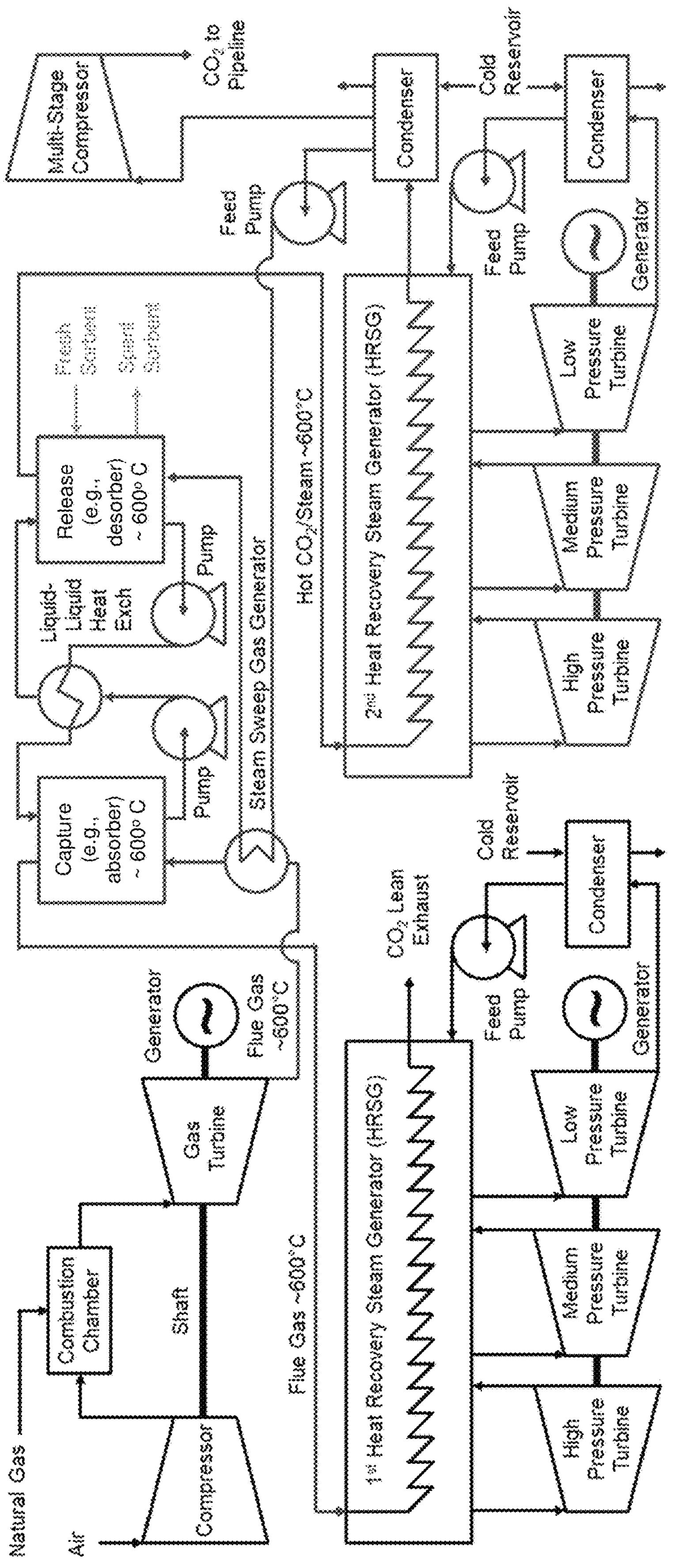
FIG. 8 provides a schematic of detailed system level designs for natural gas combined cycle (NGCC) with carbon capture with additional equipment for the steam sweep process, according to some embodiments.

In certain embodiments, the quality of steam is maintained, at least in part, by an energy source internal to the process that generates the acid gas. One example of such an embodiment is shown in FIG. 3A. In FIG. 3A, acid gas source 310 comprises energy source 315 internal to the process that generates the acid gas. Energy 325 from energy source 315 maintains the quality of the steam within steam source 320. Acid gas from acid gas source 310 may enter regenerator 340 via acid gas inlet 330 while steam, maintained, at least in part, by the energy source 315 internal to acid gas source 310, may enter regenerator 340 via steam inlet 335. In some such embodiments, the energy source can originate from fuel within the process that generates the acid gas. In such cases, the steam quality can be maintained, at least in part, by the energy content of fuel within the process that generates the acid gas. For example, in FIG. 3A, in some embodiments, energy source 315 can be fuel from within acid gas source 310. One such embodiment is shown in FIG. 8 and described in more detail below in Example 2.

Figure 3B:
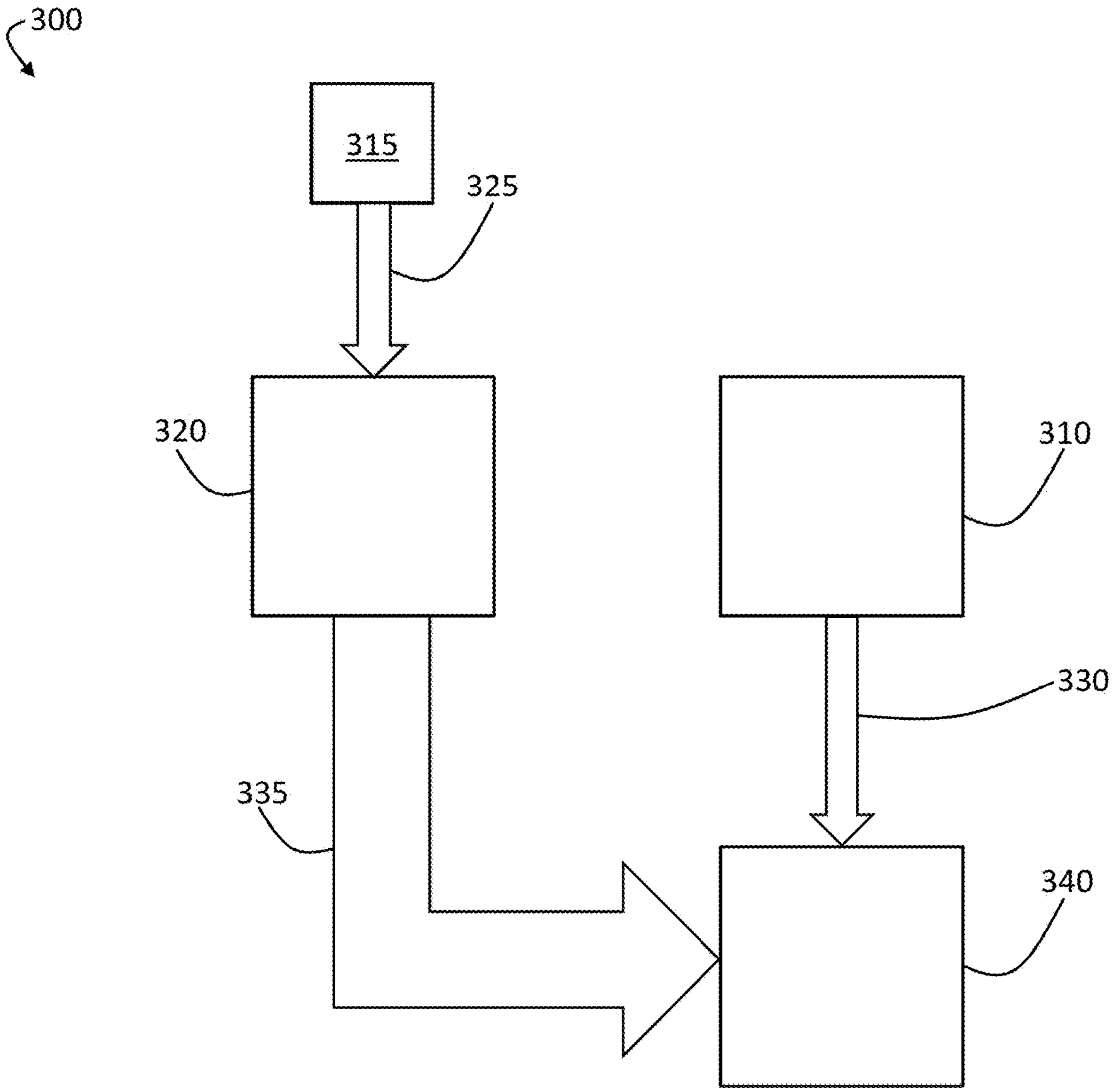
FIG. 3B is a schematic diagram showing steam quality maintained by an energy source external to the process that generates the acid gas, according to certain embodiments.
Figure 7A:
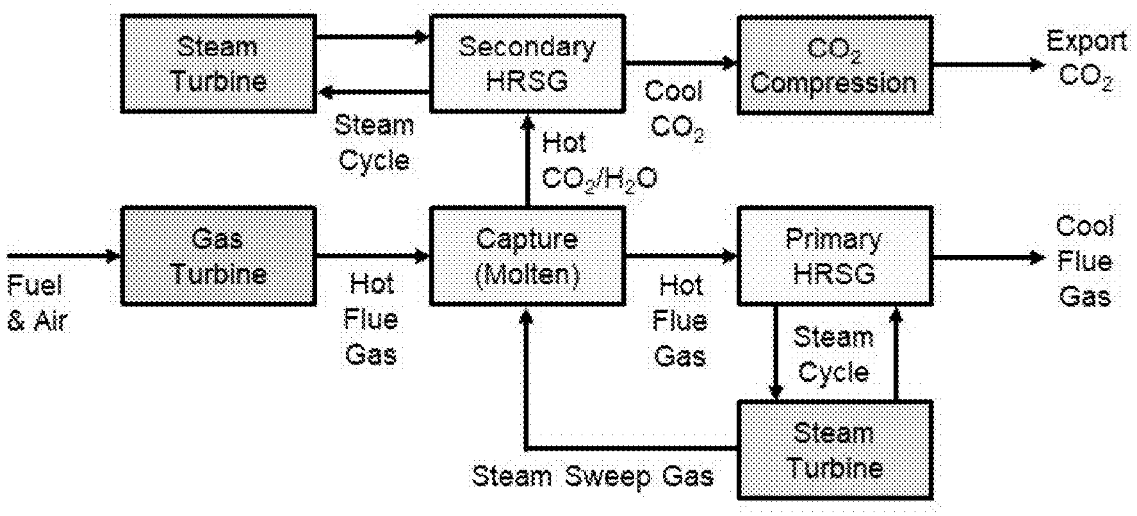
FIGS. 7A-7B show schematics of simplified system level designs for carbon capture based on natural gas combined cycle (NGCC) and steam methane reforming (SMR) with sorption enhanced reforming (SER) designs, according to some embodiments.
Figure 7B:
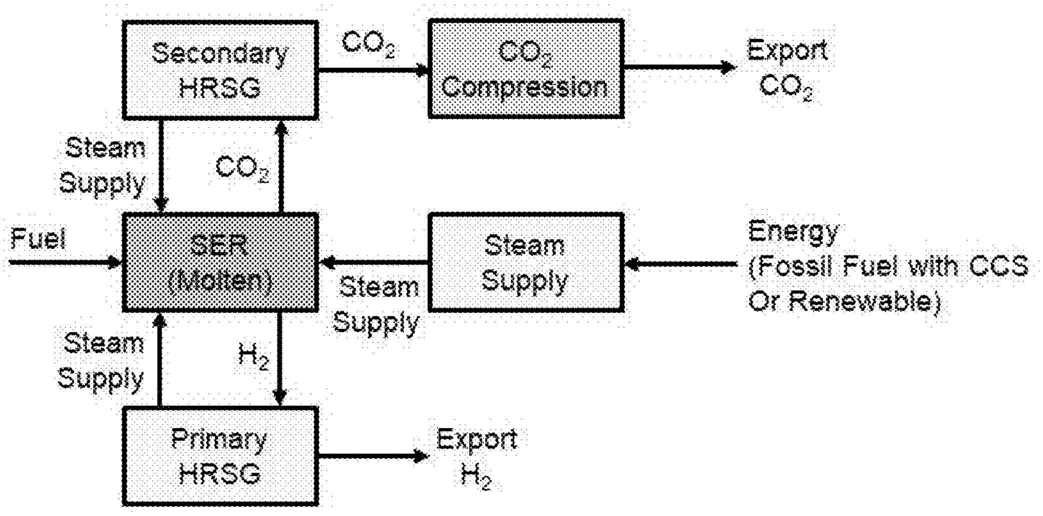

In some embodiments, the steam quality is maintained, at least in part, by an energy source external to the process that generates the acid gas. One example of such an embodiment is shown in FIG. 3B. In FIG. 3B, the process that generates the acid gas is acid gas source 310; however, now energy source 315, external to acid gas source 310, maintains the steam quality of steam source 320 via energy exchange 325. Acid gas from acid gas source 310 may enter regenerator 340 via acid gas inlet 330 while steam, maintained, at least in part, by the energy source 315 external to acid gas source 310, may enter regenerator 340 via steam inlet 335. In some embodiments, the steam quality is maintained, at least in part, by a steam cycle powered by a process separate from the process that generates the acid gas. For example, in FIG. 3B, in some embodiments, energy source 315 can be an external steam cycle-powered process. One such embodiment is shown in FIG. 7B and described in more detail below in Example 2.

In some embodiments, the environment within which the regeneration takes place is part of an industrial process. "Industrial processes" are those that involve chemical, physical, electrical, or mechanical steps to aid in the manufacturing of an item or items and/or in the generation of power. In some embodiments, the environment may be part of an industrial process comprising the combustion of fuels, including natural gas, oil, coal, biomass, or the production of chemicals including, steel, cement, or hydrogen. Others may exist. Additional non-limiting examples of industrial processes include power production process (e.g., within a power plant), chemical manufacturing processes, and machine manufacturing processes. In some embodiments, the industrial process comprises a natural gas combined cycle (NGCC) and/or steam methane reforming (SMR) process, optionally with sorption enhanced reforming (SER). In certain embodiments, the industrial process comprises NGCC with carbon capture. In some embodiments, the industrial process comprises cement production with carbon capture.

In some embodiments, steam is taken directly from the steam cycle of a power plant which is producing the acid gas that is captured by the sorbent (e.g., coal power plant which may itself produce substantial amounts of steam). In some embodiments, steam is generated in a separate steam cycle using the energy produced by the power plant (e.g., natural gas power plant which may not produce much steam itself). In another embodiment, steam is taken directly from the steam cycle of a power plant that is not producing the acid gas being captured (e.g., steam generated by a concentrated solar plant to regenerate $CO_2$ captured in a cement plant). In yet another embodiment, steam may be generated in a separate steam cycle using energy produced externally (e.g., electrical energy from a wind turbine used to reheat steam to regenerate $CO_2$ captured in a cement plant).

As noted above, any of a variety of sorbents may be used in accordance with certain embodiments. According to certain embodiments, the sorbent comprises an alkali metal borate. The alkali metal borate generally includes at least one alkali metal, boron, and oxygen.

The term “alkali metal” is used herein to refer to the following six chemical elements of Group 1 of the periodic table: lithium (Li), sodium (Na), potassium (K), rubidium (Rb), cesium (Cs), and francium (Fr).

In some embodiments, the at least one alkali metal of the alkali metal borate comprises cationic lithium (Li), sodium (Na), potassium (K), rubidium (Rb), and/or cesium (Cs). In some embodiments, the at least one alkali metal comprises lithium (Li), sodium (Na), and/or potassium (K). In certain embodiments, the at least one alkali metal comprises Li and Na in equal amounts.

In some embodiments, the fractional stoichiometry of a sorbent (e.g., a salt, an alkali metal borate, a molten alkali metal borate) described herein can be expressed as $A_xB_{1-x}O_{1.5-x}$, wherein A is one or more alkali metals (e.g., Li, Na, Li, and Na), B is boron, O is oxygen, and x is between zero and 1. In certain embodiments, x may refer to a mixing ratio, as is described below. In some embodiments, the fractional stoichiometry is that of the sorbent in solid form before melting the sorbent. In some embodiments, the fractional stoichiometry is that of the sorbent after melting the sorbent. As used herein, the term “mixing ratio” of an alkali metal cation or combination of metal cations in a sorbent refers to the ratio of moles of metal cation(s) in a sorbent to the total of moles of metal cation(s) plus moles of boron in the sorbent. For example, the mixing ratio of sodium in $Na_3BO_3$ is 3/(3+1)=0.75; the mixing ratio of alkali metals in $(Li_{0.5}Na_{0.5})_3BO_3$ is (0.5*3+0.5*3)/(3+1)=0.75. In some embodiments, the mixing ratio is at least 0.5, at least 0.6, or at least 0.667. In some embodiments, the mixing ratio is at most 0.9, at most 0.835, at most 0.8, at most 0.75, or at most 0.7. Combinations of the above-referenced ranges are also possible (e.g., between or equal to 0.5 and 0.9, between or equal to 0.6 and 0.8, between or equal to 0.7 and 0.8). Other ranges are also possible. Without wishing to be bound by theory, there may be a mixing ratio (for a certain alkali metal cation or combination of metal cations) below which the acid gas uptake capacity of the sorbent is less than desirable. Without wishing to be bound by any theory, there may be a mixing ratio (for a certain alkali metal cation or combination of metal cations) above which the regeneration efficiency of the sorbent is less than desirable. In some embodiments, the alkali metal comprises lithium (Li), sodium (Na), potassium (K), and/or a mixture of these. In some embodiments, the alkali metal comprises Li and Na in equal amounts.

It should be understood that the embodiments disclosed herein are not limited to those in which alkali metal borates (molten or otherwise) are used as sorbents, and in other embodiments, other sorbents may be used.

U.S. Provisional Patent Application No. 62/988,436, filed Mar. 12, 2020, and entitled “Processes for Regenerating Sorbents, and Associated Systems”; U.S. Provisional Patent Application No. 62/979,628, filed Feb. 21, 2020, and entitled “Processes for Regenerating Sorbents, and Associated Systems”; and U.S. Provisional Patent Application No. 62/932,410, filed Nov. 7, 2019, and entitled “Process for Regenerating Sorbents at High Temperatures,” are each incorporated herein by reference in their entirety for all purposes.

The following examples are intended to illustrate certain embodiments of the present invention, but do not exemplify the full scope of the invention.

EXAMPLE 1

This example describes the process of regenerating sorbents using steam to remove acid gases (e.g., carbon dioxide) from the sorbent. It also describes how regenerating a sorbent may be done in many cycles (e.g., cyclically) to effect multiple iterations of sorbent regeneration.

Experimental Setup of Bench Scale Experiments

Bench scale experiments were designed as follows. These bench scale experiments may guide in the industrial scale design of reactors, such as those described in the prophetic designs in Example 2.

Nickel tubes (Nickel 200/201, Magellan Metals) with ½" outside diameter and 0.41" (1 cm) inside diameter were cut to size and bent into the desired shape with a tube bender to form tubular reactors. Each tubular reactor contained a kink such that the molten sample spread evenly along the base of the tube and was contained inside the furnace, with approximate dimensions shown in FIG. 4A.

The tubes were inserted into a tube furnace (OTF-1200, MTI Corp), externally insulated with quartz wool and aluminum foil, and connected to upstream and downstream pipework with stainless steel compression fittings. Upstream a digital mass flow controller (GFC17, Aalborg) and mass flowmeter (XFM17, Aalborg) provided a steady flow of $CO_2$ at various concentrations (Airgas). For each $CO_2$ concentration the flowmeter was calibrated against a flowmeter with adjustable gas settings (00412ML, ColeParmer). Pressure gauges (DPG409, Omegadyne) were located upstream and downstream of the tubular reactor. Downstream a filter (F504-02DHSS, Parker Watts) was chilled externally with ice to act as a separator and remove any water vapor, subsequently the $CO_2$ concentration was measured by infrared detection (CM-0154, $CO_2$ Meter).

Sorbent Regeneration

The regeneration of sorbents used for acid gas capture is an important part of processes designed to reduce emissions. The examples provided herein primarily focus on the problem of global warming and $CO_2$ emissions, but the processes and systems described herein can be extended to other acid gasses, for example $SO_x$ and $NO_x$, and other global challenges, for example acid rain.

The regeneration of sorbents used for the capture of acid gases, in particular carbon dioxide, from industrial streams may find application in the energy and chemicals industries. Options for regeneration include temperature swings, partial pressure swings, and electric potential swings. In each case, capture is carried out at one set of conditions, for example at a low temperature, and the regeneration is carried out in a different environment, separated either spatially or temporally, under a different set of conditions, for example a higher temperature. Existing process designs are often inefficient because they fail to efficiently utilize the energy content of the various streams involved. In part this is related to limitations inherent in the materials used for capture. However, materials described elsewhere herein can provide highly efficient regeneration processes.

The inventors have recognized and appreciated that an important improvement is to operate the system isothermally or near-isothermally at high temperatures and use steam to reduce the partial pressure of acid gas in the regenerator (e.g., the desorber) to drive the regeneration, subsequently condensing the steam from the mixture of acid gas and steam to generate a high purity acid gas product. In this way the energy content of both the separated acid gas and the steam used to reduce the partial pressure can be recovered in a downstream heat exchanger. Without wishing to be bound by any theory, it is believed that the steam does not interact with the sorbent per se but, rather, provides an entropic driving force for the release of an acid gas by reducing the partial pressure in the release environment. Unlike other gases which may be used as sweep gases to reduce the partial pressure (e.g., $N_2$, argon), steam is easily separated from the acid gas in a condenser.

Figure 4A:
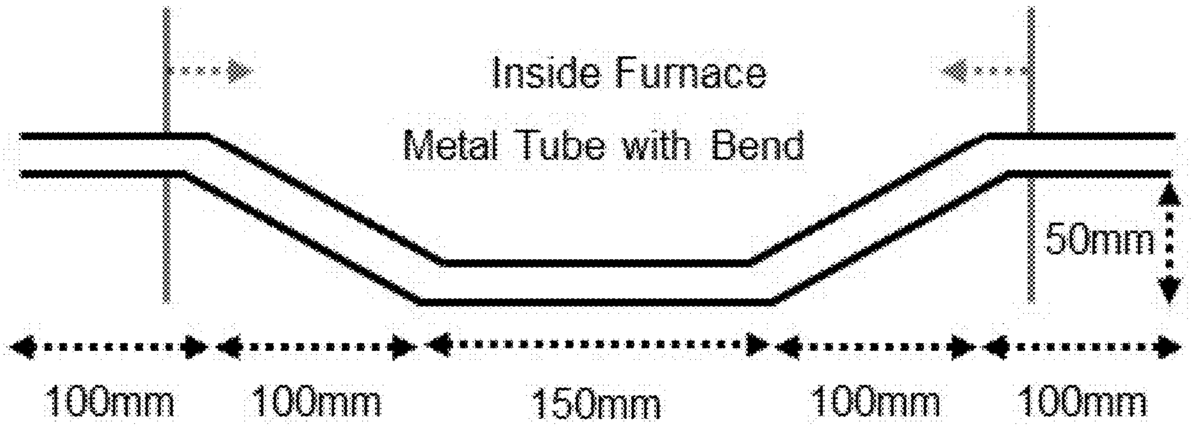
FIG. 4A is a schematic illustration of the loading of acid gases into a tube furnace, according to some embodiments.
Figure 4B:
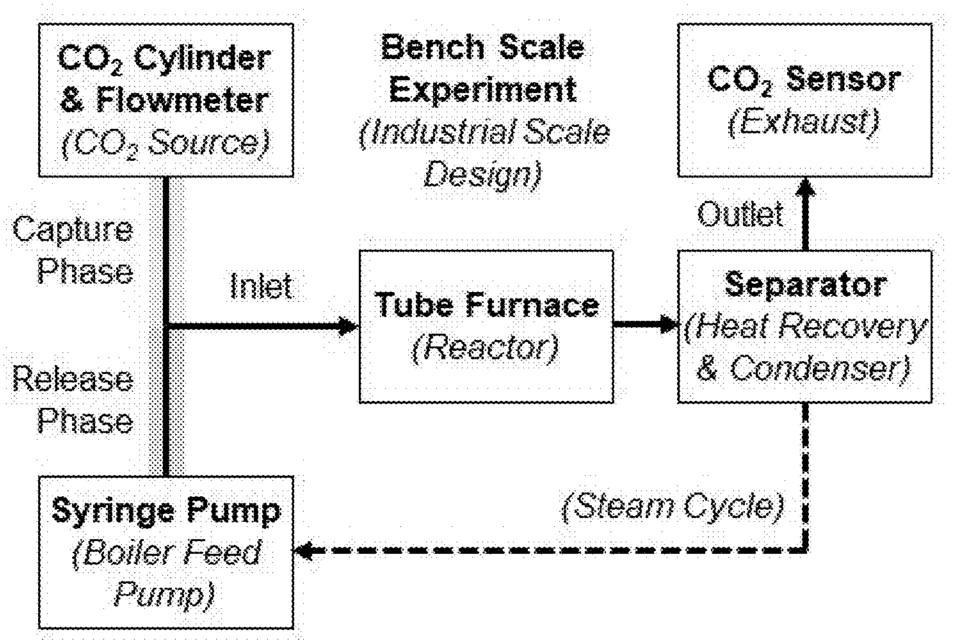
FIG. 4B depicts a block flow diagram of experimental set-up (bold) and industrial scale design (italics) for high temperature carbon capture using steam as a sweep gas, according to one set of embodiments.

Molten alkali metal borates may be used a sorbent throughout the regeneration process. These molten alkali metal borates may possess many features that make them promising sorbents for carbon capture. One of these features is their high working capacity under a change in $CO_2$ partial pressure. For sources of $CO_2$ near ambient pressure, pressure swings can generally be driven either by pulling a vacuum, which tends to be highly inefficient and difficult to maintain at scale, or with a sweep gas. Sweep gases (e.g., $N_2$, argon) can dilute the product rather than upconcentrate it and therefore have found limited use in low temperature carbon capture systems. However, at high temperatures a convenient, advantageous sweep gas is found in steam, since steam readily condenses once the $H_2O/CO_2$ mixture is cooled after standard heat recovery units. FIG. 4B, schematically illustrates a block diagram demonstrating this concept.

Figure 4C:
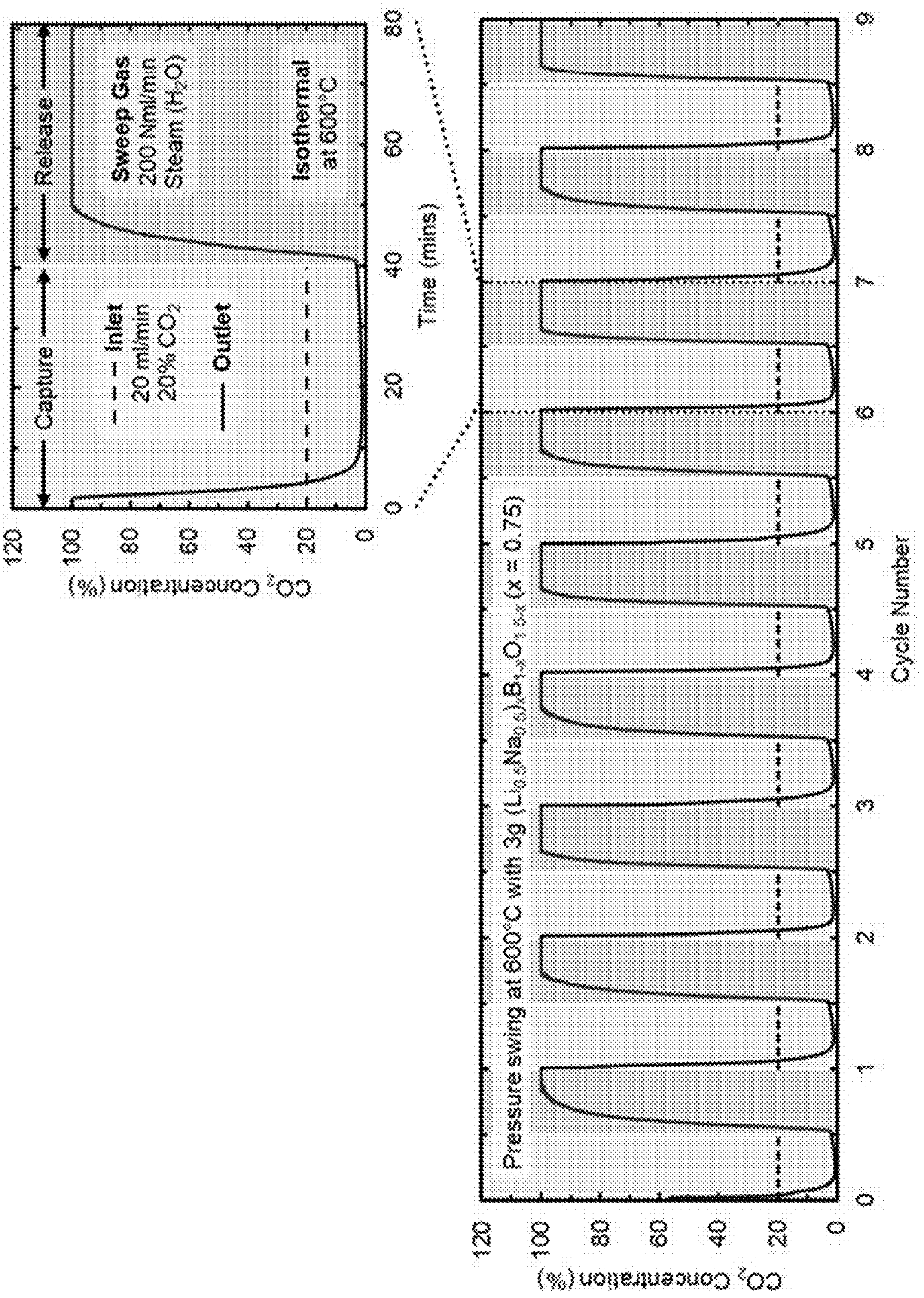
FIG. 4C shows a schematic illustration of isothermal capture and release of acid gases with multiple cycles, according to one set of embodiments.

The equipment used in the bench scale experiment is shown in bold with the analogous industrial scale process units in parenthesis and italics. In the capture step the $CO_2$ containing stream is fed into the tubular reactor and the $CO_2$ is removed. As depicted in FIG. 4C, using 20 ml/min of 20% $CO_2$ removed ~90% of the incoming stream. In the release step the feed is switched to steam which reduced the partial pressure of $CO_2$ in the reactor extracting $CO_2$ from the sorbent. Subsequently the combined $H_2O/CO_2$ mixture was cooled and the steam condensed in a separator to form a pure $CO_2$ stream. The cycle in schematically illustrated in FIG. 4C is part of a series of cycles shown in the inset of FIG. 4C that demonstrates the repeatability of capture and release by this method over many cycles.

A high temperature carbon capture unit can be operated isothermally and at ambient pressures without the need for oxy-combustion driven release as commonly practiced with the existing method of calcium looping. Advantageously, the energy content of the $H_2O/CO_2$ mixture may be recovered in a heat recovery steam generator (HRSG) prior to separation in the condenser thereby recovering valuable high quality heat during both capture and release, resulting in a highly energy efficient process. Without wishing to be bound by any theory, the steam does not interact with the sorbent per se but provides an entropic driving force for the release, the same way a flow of pure nitrogen does. Therefore, more convenient experiments that use nitrogen are directly comparable to those that use steam as a sweep gas.

The process described herein can be highly efficient in separating and regenerating acid gases from industrial streams. The process design applied to a natural gas combined cycle (NGCC) power plant with carbon capture is presented in subsequent prophetic examples. In an industry when vast effort and capital are deployed to improve efficiency by fractions of a percentage point, the process described herein is expected to substantially reduce the energy penalty for the removal of $CO_2$ as compared to existing systems in this field. Other applications of this process design exist for other fuels, such as coal, oil, or biomass, or chemical processes which release $CO_2$ including smelting of metals, the production of cement, and steam methane reforming for hydrogen production. In these cases, similar efficiency gains are expected.

Molten sorbents, specifically molten alkali metal borates, are described in this example and elsewhere herein. However other sorbents may be used, such as solid alkali metal borates. The molten sorbents may have high working capacities under the pressure swings that occur during regeneration (e.g., the introduction of steam, release of acid gases from the sorbent). In addition, the molten sorbents can be very stable under high temperature and isothermal operation conditions, which can provide efficient recovery of heat. The fluidic nature of the molten sorbents can provide efficient heat exchange, seamless transfer between capture and release environments, and the ability to compress to higher pressures.

Figure 4D:
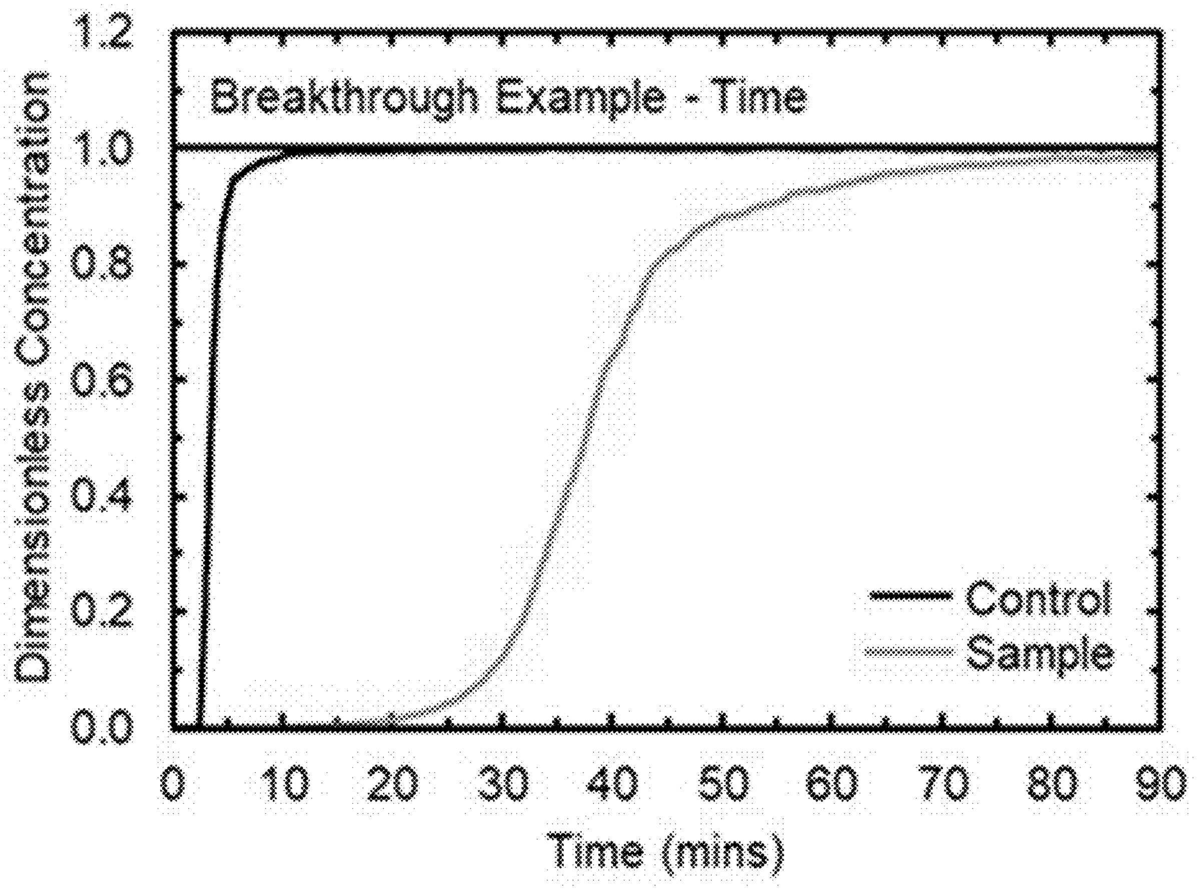
FIG. 4D shows a plot of the dimensionless concentration (e.g., the outlet gas concentration divided by the inlet gas concentration) as function of time with a control and a sample, according to one set of embodiments.
Figure 5:
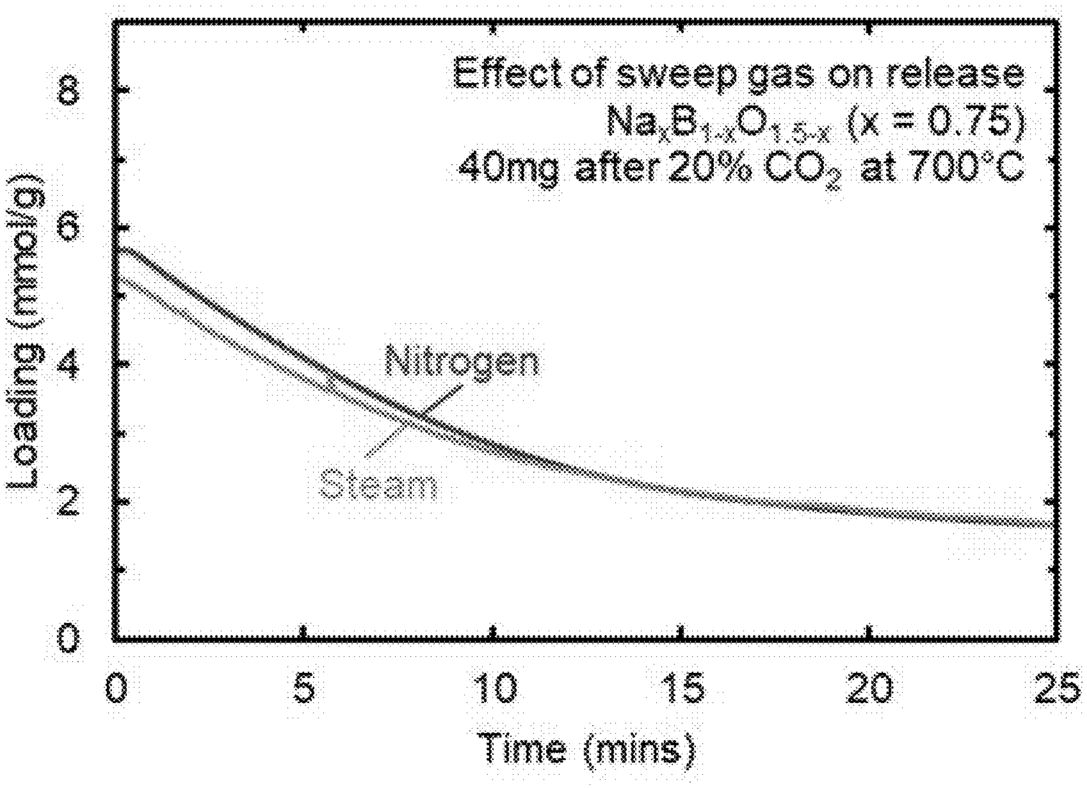
FIG. 5 is a plot of loading of acid gas within a sorbent as a function of time, according to some embodiments.
Figure 6:
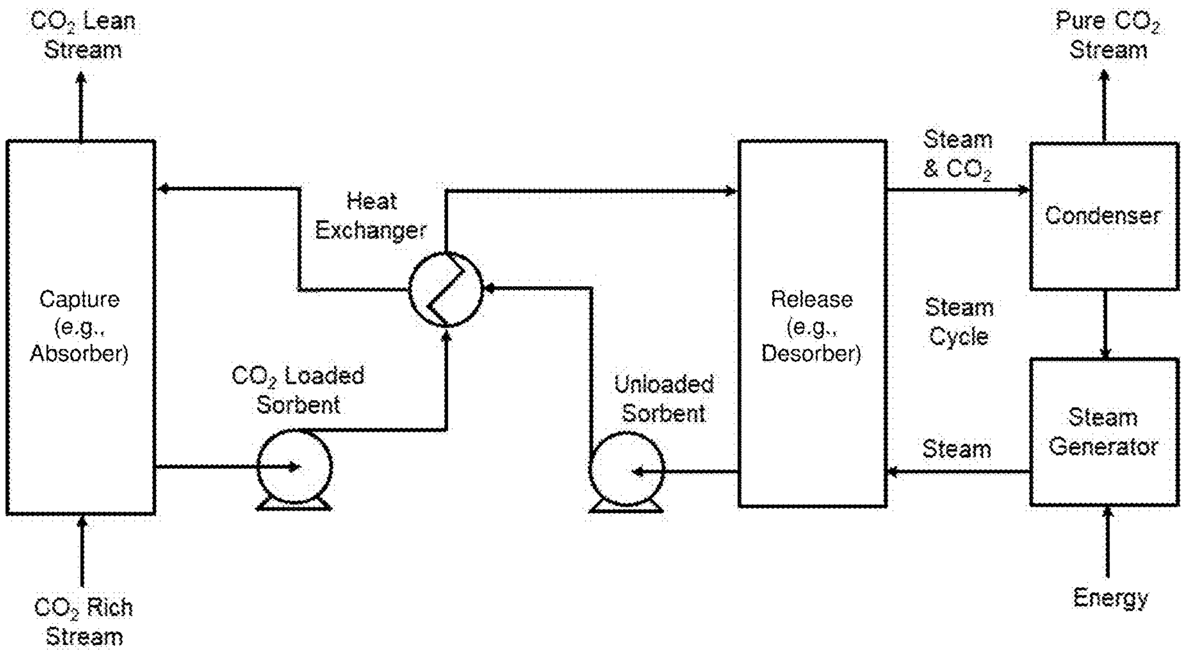
FIG. 6 shows a process schematic for the continuous circulation of sorbent between environments dedicated to capture and release, using steam to drive regeneration in the release environment, according to some embodiments.
Figure 9:
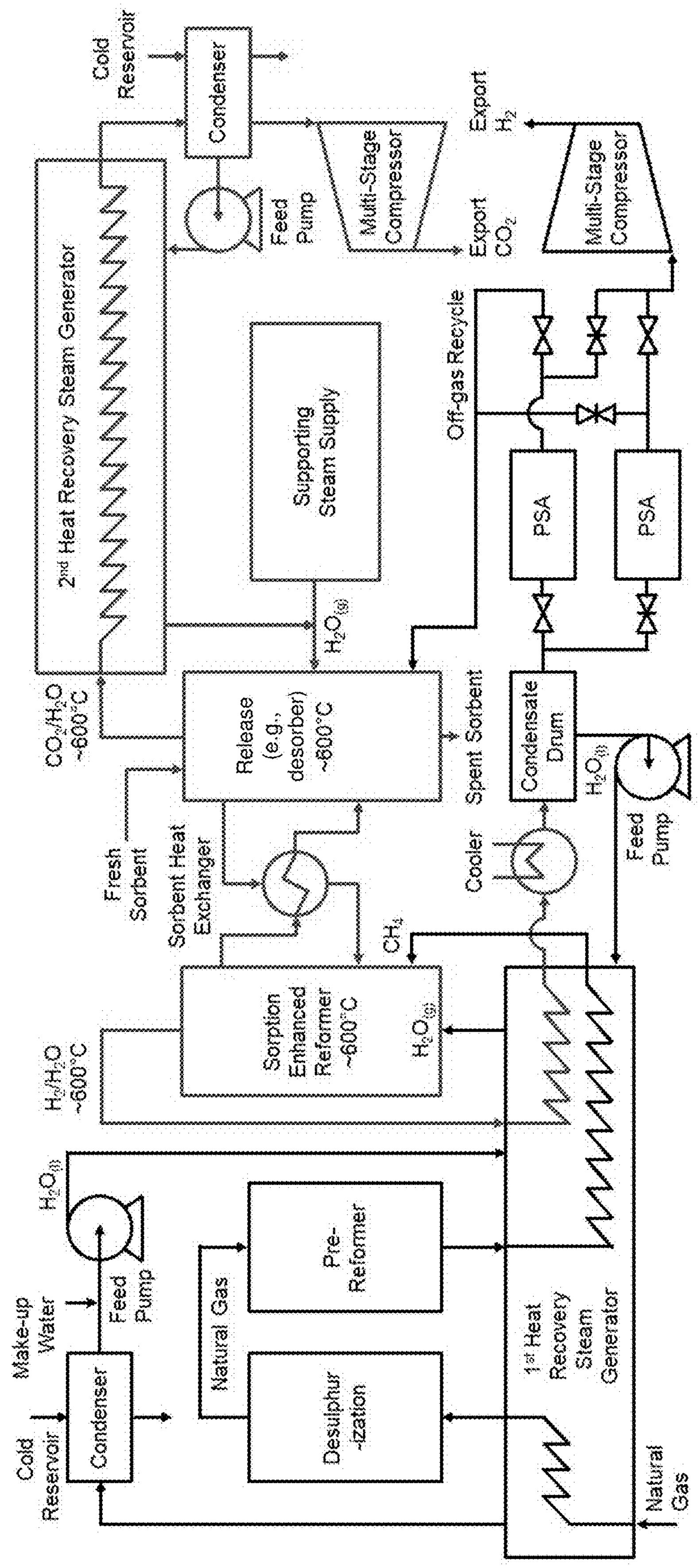
FIG. 9 provides a schematic of detailed system level designs for steam methane reforming with sorption enhanced reforming with carbon capture with the additional equipment for the steam sweep process, according to some embodiments.
Figure 10:
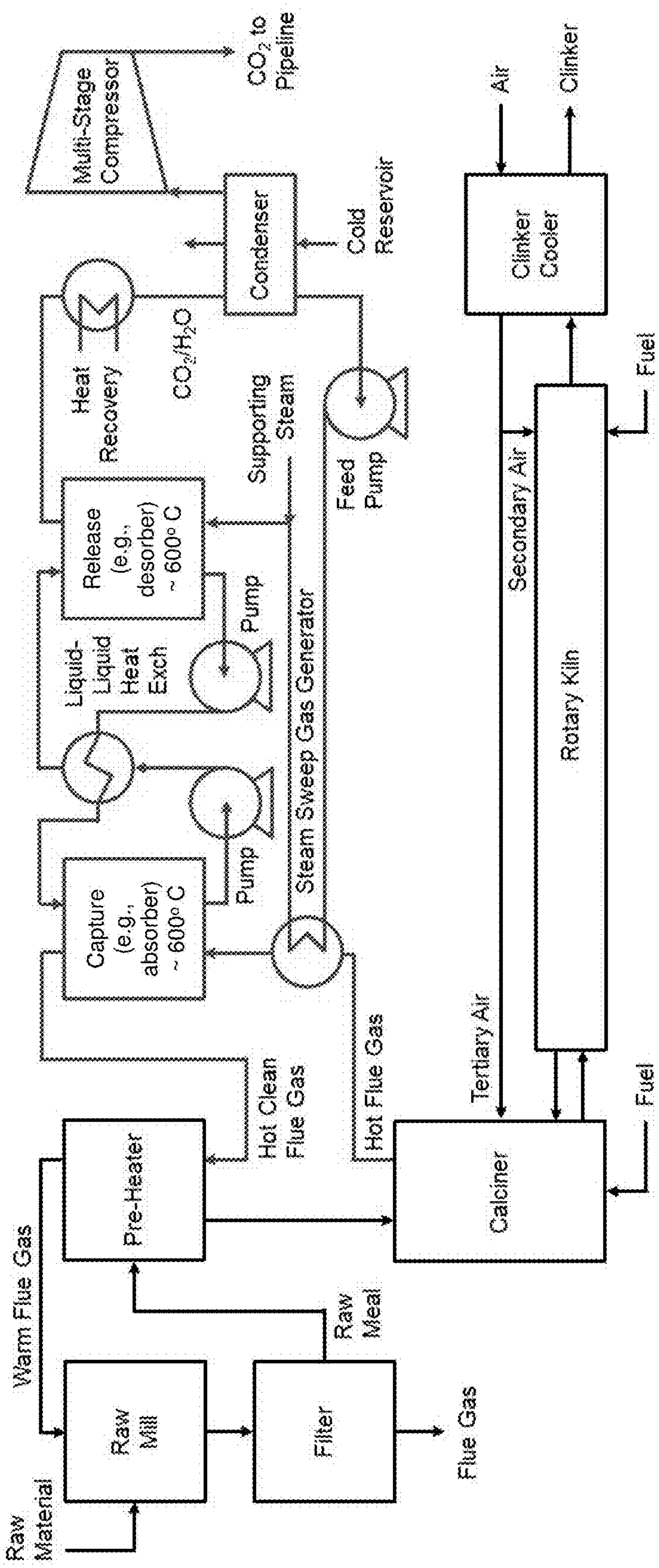
FIG. 10 provides a schematic of detailed system level designs for cement production with carbon capture, showing the additional equipment for the steam sweep process, according to some embodiments.

FIGS. 4-5 detail the underlying concept and the experiments carried out to demonstrate a functional system, while FIG. 6 shows how the reactor may be spatially separate with continuous circulation between a dedicated capture and release environments. This is in contrast to the fixed bed in FIG. 4D where capture and release are separated temporally in a single reactor. As described in more detail in Example 2, FIGS. 7A-7B present block diagrams of the process applied to a natural gas combined cycle and a steam methane reforming system, while FIGS. 8-10 schematically illustrate a more detailed picture of the process design for a natural gas combined cycle, a steam methane reforming system, and a cement production plant, respectively, and will be described further below.

Sorbent Regeneration Performance

The performance of the sorbents was analyzed by investigating the breakthrough behavior of the sample loaded inside the tubular reactor. Breakthrough behavior may be determined as follows. An empty tube may be filled with nitrogen gas and a stream of $CO_2$ may be flowed through the tube, as schematically illustrated in FIGS. 4A and 4D. A $CO_2$ detector at the end of the tube may measure nitrogen for a time, and as the nitrogen is pushed out of the tube, $CO_2$ may then reach the detector, or "breakthrough," and be detected by the $CO_2$ detector. In some cases, a "plug flow" may occur as a sudden change, but in practice a more gradual breakthrough may be observed, as shown in the "control" plot in FIG. 4D. When the tube contains a sorbent, as in FIG. 4D in the "sample" plot, the breakthrough is delayed because the sorbent can capture some or all the incoming $CO_2$ and the sensor continues to detect only nitrogen. However, after some time, the sorbent may reach its capacity for $CO_2$ and the $CO_2$ pushes all the way through the tube to reach, or breakthrough to, the $CO_2$ detector.

The sample (e.g., the sorbent) was weighed, inserted into the tube, then pre-treated at 800° C. under a flow of $N_2$ to melt the sample and remove any residual $H_2O/CO_2$. Pretreatment was considered complete once the composition of the stream leaving the system dropped below ~0.1% $CO_2$ at 800° C.

At time=0, the gas flow was switched from $N_2$ to $CO_2$ while monitoring the outlet $CO_2$ concentration. FIG. 4D shows a plot where the dimensionless concentration is the outlet concentration divided by the inlet. A control experiment flowing under conditions of no-capture, for example at room temperature, is compared to $CO_2$ capture conditions where breakthrough is delayed. The area between the non-capture control and the capture experiment gave the sorbent's capacity, which was calculated in mmol of $CO_2$ per gram of sorbent (mmol/g).

Outside of FIG. 4D, breakthrough profiles may be presented as bed volumes of $CO_2$ normalized by sample mass.

The bed volume is determined from the control experiment by integrating the area bound by the x-axis at time=0, dimensionless concentration=1, and the breakthrough curve for a given flowrate. To avoid plotting a control in each case, one bed volume, i.e. the volume of the system, was then subtracted. As such the area bound by the x-axis at time=0, dimensionless concentration=1, and the breakthrough curve for a given flowrate gives the $CO_2$ capacity in breakthrough plots other than those shown in FIG. 4D.

Bed volumes can be converted into bed volumes of $CO_2$ through multiplication with the inlet $CO_2$ concentration, and then normalized by the sample mass loaded into the tube to give normalized bed volume of $CO_2$ (1/g). As hygroscopic samples lose mass during the pre-treatment step, the mass loss can be determined by thermogravimetric analysis (Q-50, TA Instruments) and accounted for in the normalization and capacity calculations.

Comparison of Steam and Nitrogen in Sorbent Regeneration Performance

Next, it was shown that steam can be used to effect the regeneration of a sorbent in a manner similar to an inert gas, such as nitrogen. FIG. 5 illustrates the performance of steam as a sweep gas compared to nitrogen gas. Before time zero the sample (e.g., the sorbent) spent 60 mins under 20% $CO_2$ and is considered to be fully loaded with $CO_2$. At time zero mins the gas flow was switched, either to nitrogen or steam (water injection into the furnace). In both cases the loading of $CO_2$ decreases in a similar manner suggesting the method of release is similar for both sweep gases. This demonstrates that steam can be used to effect the entropy-driven release of acid gas from the sorbent. That is to say, without wishing to be bound by any theory, the steam does not interact with the sorbent but provides an entropic driving force similar to nitrogen. But unlike nitrogen, steam can be readily condensed and removed from the acid gas as described previously and elsewhere herein.

EXAMPLE 2

The following provides prophetic examples of processes for sorbent regeneration. In some cases, sorbent regeneration can be coupled with industrial processes.

Continuous Circulation of Sorbent Between a Dedicated Capture and Release Environments As schematically illustrated in FIG. 6, the $CO_2$ rich stream can be contacted with the sorbent in the capture environment resulting in a treated $CO_2$ lean stream and a sorbent loaded with $CO_2$. The $CO_2$ loaded sorbent can be pumped to the release environment via a transfer pump and a heat exchanger. The heat exchanger may contact the loaded sorbent with the unloaded sorbent. The aim of the heat exchanger is to maintain a similar temperature in both the capture and release environments. In certain cases, this alone may not be enough to equalize the temperatures in the capture environment and release environment. In some cases, to circumvent this issue, one option would be to locate the release environment inside the capture environment. For example, the release environment may comprise tubes that run through the capture environment. In the release environment the $CO_2$ loaded sorbent is contacted with steam and the $CO_2$ can be stripped from the sorbent while the unloaded sorbent can be returned to the capture environment via a transfer pump and a heat exchanger. The steam $CO_2$ mixture can then be cooled, and $CO_2$ can be separated from the water as the latter condenses. The $CO_2$ may then be sent for compression and export while the water is raised to steam and the cycle repeats.

Carbon Capture Using the Natural Gas Combined Cycle (NGCC) and the Steam Methane Reforming (SMR) with Sorption Enhanced Reformed (SER)

At the plant level for a NGCC fuel, air may be fed into a gas turbine and hot flue gases may be produced. These hot flue gases can be passed into the capture block, as schematically illustrated in FIG. 7A, along with steam to produce a $CO_2$-lean flue gas and a steam $CO_2$ mixture. The hot, $CO_2$-lean flue gas can then be used to drive a steam turbine with some steam being used to supply the capture block. The steam $CO_2$ mixture may also pass through a steam cycle as the $CO_2$ and steam are separated. For a sorption-enhanced reforming plant, the fuel (typically methane) can be sent straight into the capture/conversion block (schematically shown in FIG. 4B and with more detail in FIG. 9). Steam can be used both as a reactant and as a sweep gas (in separate vessels) to generate a hydrogen-rich stream and a steam/$CO_2$ mixture which can be separated after the secondary heat recovery steam generator (HRSG). An external steam supply may be required to supply sufficient steam, which may come from a neighboring power plant or a renewable source.

A Detailed System Level Design of NGCC with Carbon Capture

As shown in FIG. 8, natural gas can be fed into the combustion chamber along with compressed air. The gas turbine may drive the compression via a shaft and may also supply energy to the generator for conversion into electricity. The hot flue gases can be used to generate steam (or supplement steam generation) and can be sent through the capture environment where the steam is contacted with the sorbent and $CO_2$ is removed. The flue gas may then pass the $1^{st}$ HRSG to generate further steam at various pressure levels (e.g., high, medium, low). These steam turbines can then generate electricity (as schematically shown in FIG. 8) or may support the supply of steam sweep gas (not shown in the figure). The condensate can then return to the HRSG via a feed pump and a cold reservoir may be required as a heat sink. The sorbent may then pass to the release environment via a transfer pump to a heat exchanger where the steam sweep gas can be used to strip the sorbent of the $CO_2$. The sorbent can then be returned to the capture environment to complete the cycle while the steam/$CO_2$ mixture can be passed to a $2^{nd}$ HRSG to generate further steam at various pressure levels (e.g., high, medium, low). These steam turbines can generate electricity (as schematically shown in FIG. 8) or may support the supply of steam sweep gas (not shown in the figure). In some embodiments, the $2^{nd}$ HRSG operates the same as the $1^{st}$. As a final step the cooled steam/$CO_2$ mixture may pass through a condenser to recycle the condensate and generate a $CO_2$ stream ready for compression and export.

A Detailed System Level Design for Steam Methane Reforming with Sorption-Enhanced Reforming with Carbon Capture Natural gas may be preheated in the $1^{st}$ HRSG, desulfurized, pre-reformed (i.e., converted to predominantly methane), and then further preheated in the $1^{st}$ HRSG before passing to the reactor (sorption-enhanced reformer), as schematically illustrated in FIG. 9. Steam from the 1st HRSG and the sorbent may also be sent to the reactor to convert methane into hydrogen and $CO_2$. As a result, excess steam and the hydrogen product may exit the reactor as gases while the $CO_2$ is removed with the sorbent as a liquid and passes to the release environment. The steam in the release environment may be used to release the $CO_2$ from the sorbent generating a steam/$CO_2$ mixture which passes through a 2nd HRSG. As the temperature drops, the steam may be passed through a condenser to separate the condensate, which can be recycled via a feed pump, and the $CO_2$ product may be sent for compression and export. The steam generated can be used as the steam sweep gas and is supplemented by a supporting steam supply (e.g. a renewable source). The hydrogen and steam mixture may drive the 1st HRSG and can be separated via a cooler, with the condensate recycled through a feed pump. To ensure a high purity hydrogen product a conventional pressure swing absorption (PSA) unit may be included with the off-gas returned to the release environment where further sorption-enhanced reforming would occur. The hydrogen may then be compressed for export.

A Detailed System Level Design for Cement Production with Carbon Capture

As schematically shown in FIG. 10, raw material (e.g., limestone) can be fed into the raw mill and filtered to produce raw meal. The raw meal may then be pre-heated before being sent to the calciner where $CO_2$ is driven from the limestone to produce predominantly calcium oxide. The product can pass through the rotary kiln to generate a clinker which may be cooled in a clinker cooler and made ready for export. The process may be driven by fuel (typically coal, as one non-limiting example) which can enter both the rotary kiln and calciner and can be combusted in the presence of air. The air can then be used as the cooling medium in the clinker cooler and is therefore preheated before entering the rotary kiln and calciner. Typically, the hot flue gas then passes to the pre-heater but in the case of $CO_2$ capture the hot flue gas may first be used to generate steam in the steam sweep gas generator and passed through the capture environment to capture $CO_2$. The cleaned hot flue gas can then be passed through the pre-heater, raw mill, and filter as in the conventional process. To maintain the same level of pre-heating, additional fuel may be required. The $CO_2$-loaded sorbent can then pass through a transfer pump and heat exchanger to the release environment as described previously in the Examples. Supporting steam may be required for the release which may come from a neighboring power plant or renewable sources. The steam/$CO_2$ mixture can then be separated in a condenser with the steam recycled and the $CO_2$ compressed for export.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:

transporting natural gas and compressed air to a combustion chamber;

combusting the natural gas and the compressed air in the combustion chamber to produce flue gas;

transporting the flue gas to an absorber comprising sorbent such that carbon dioxide from the flue gas is captured by the sorbent and processed flue gas lean in carbon dioxide relative to the flue gas produced in the combustion chamber exits the absorber; and transporting the processed flue gas to a heat recovery steam generator such that heat recovered from the processed flue gas is used to produce steam, wherein the sorbent comprises an alkali metal borate.

2. The method of claim 1, further comprising, prior to transporting the flue gas to the absorber, transporting the flue gas through a turbine to generate electricity.

3. The method of claim 1, comprising compressing air using a gas turbine to generate the compressed air.

4. The method of claim 1, wherein a first portion of the steam from the heat recovery steam generator drives a first turbine at a first pressure to generate electricity.

5. The method of claim 4, wherein a second portion of the steam from the heat recovery steam generator drives a second turbine at a second pressure that is higher than the first pressure to generate electricity.

6. The method of claim 5, wherein a third portion of the steam from the heat recovery steam generator drives a third turbine at a third pressure that is higher than the first pressure and higher than the second pressure to generate electricity.

7. The method of claim 1, wherein the sorbent is in molten form.

8. The method of claim 1, further comprising transporting the sorbent comprising the captured carbon dioxide to a desorber, wherein at least a portion of the captured carbon dioxide is separated from the sorbent in the desorber, thereby obtaining separated carbon dioxide.

9. The method of claim 8, wherein at least a portion of the steam from the heat recovery steam generator is directed to the desorber and is used to separate the at least the portion of the captured carbon dioxide from the sorbent.

10. The method of claim 8, wherein at least 10 mol % of the captured carbon dioxide is separated from the sorbent in the desorber.

11. The method of claim 8, wherein at least 50 mol % of the captured carbon dioxide is separated from the sorbent in the desorber.

12. The method of claim 9, wherein a first stream and a second stream exit the desorber, wherein the first stream comprises the sorbent, and wherein the second stream comprises (i) the at least the portion of the steam from the heat recovery steam generator and (ii) the separated carbon dioxide.

13. The method of claim 12, further comprising directing the first stream back to the absorber to capture additional carbon dioxide.

14. The method of claim 12, further comprising cooling the second stream, thereby condensing the at least the portion of the steam from the heat recovery steam generator to obtain water.

15. The method of claim 14, further comprising generating additional steam from the water.

16. The method of claim 1, further comprising, prior to transporting the flue gas to the absorber, transporting the flue gas to an additional heat recovery steam generator to produce additional steam.

17. The method of claim 16, further comprising transporting the sorbent comprising the captured carbon dioxide to a desorber, wherein at least a portion of the captured carbon dioxide is separated from the sorbent in the desorber, and wherein at least a portion of the additional steam from the additional heat recovery steam generator is directed to the desorber and is used to separate the at least the portion of the captured carbon dioxide from the sorbent.

18. The method of claim 16, wherein at least a portion of the additional steam from the additional heat recovery steam generator drives a turbine to generate electricity.

19. The method of claim 8, wherein a temperature of the absorber is within 200° C. of a temperature of the desorber.

* * * * *